(12) United States Patent
Eim et al.

(10) Patent No.: US 9,900,110 B2
(45) Date of Patent: Feb. 20, 2018

(54) MOBILE TERMINAL AND CONTROLLING METHOD THEREOF

(71) Applicant: LG ELECTRONICS INC., Seoul (KR)

(72) Inventors: Sanghyun Eim, Seoul (KR); Jonghwan Kim, Seoul (KR); Jekwang Youn, Seoul (KR); Jumin Chi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 151 days.

(21) Appl. No.: 14/731,554

(22) Filed: Jun. 5, 2015

(65) Prior Publication Data

US 2015/0358088 A1   Dec. 10, 2015

(30) Foreign Application Priority Data

Jun. 5, 2014   (KR) .................. 10-2014-0068563

(51) Int. Cl.
*H04B 13/00* (2006.01)
*H04M 1/725* (2006.01)
(Continued)

(52) U.S. Cl.
CPC .......... *H04B 13/005* (2013.01); *G06F 1/163* (2013.01); *G06F 3/04883* (2013.01);
(Continued)

(58) Field of Classification Search
CPC combination set(s) only.
See application file for complete search history.

(56) References Cited

U.S. PATENT DOCUMENTS

2004/0150668 A1   8/2004 Myers et al.
2009/0233548 A1*  9/2009 Andersson ........... H04B 13/005
                                                           455/41.2
(Continued)

FOREIGN PATENT DOCUMENTS

EP         2 169 528 A2    3/2010
WO    WO 2013/009092 A2    1/2013

OTHER PUBLICATIONS

"Samsung Galaxy Gear Mobile Device User Manual"; XP055215389; Samsung Telecommunications America (STA), LLC; Richardson, Texas; 83 pages ;dated Jan. 1, 2013.
(Continued)

*Primary Examiner* — Robin Mishler
(74) *Attorney, Agent, or Firm* — Ked & Associates, LLP

(57) ABSTRACT

A mobile terminal and controlling method thereof are disclosed, by which various convenience functions can be provided in association with a device contacted with or proximate to a user's body to enable a human body communication. The present disclosure includes a human body communication unit, a touch screen, and a controller, if a $1^{st}$ touch is inputted to the touchscreen and a $2^{nd}$ touch is then inputted by maintaining the $1^{st}$ touch, controlling a device information to be exchanged with a device worn by a user by a human body communication through the human body communication unit to enable the human body communication through a body of the user while at least one of the $1^{st}$ touch and the $2^{nd}$ touch is maintained, the controller controlling information of the device work by the user to be displayed on the touchscreen using the exchanged device information.

20 Claims, 26 Drawing Sheets

(51) Int. Cl.
*H04W 76/02* (2009.01)
*H04W 12/08* (2009.01)
*H04W 4/00* (2018.01)
*G06F 1/16* (2006.01)
*G06F 3/0488* (2013.01)

(52) U.S. Cl.
CPC ......... *H04M 1/7253* (2013.01); *H04W 4/003* (2013.01); *H04W 12/08* (2013.01); *H04W 76/023* (2013.01)

(56) References Cited

U.S. PATENT DOCUMENTS

| | | | | |
|---|---|---|---|---|
| 2010/0277435 | A1* | 11/2010 | Han | G06F 3/0416 345/174 |
| 2011/0299512 | A1 | 12/2011 | Fukuda | |
| 2012/0026129 | A1* | 2/2012 | Kawakami | G06F 1/1643 345/174 |
| 2012/0108215 | A1* | 5/2012 | Kameli | H04M 1/0256 455/412.2 |
| 2012/0274573 | A1* | 11/2012 | Hwang | G06F 3/018 345/171 |
| 2014/0380492 | A1* | 12/2014 | Im | G06F 21/6218 726/26 |

OTHER PUBLICATIONS

European Search Report dated Oct. 6, 2015 issued in Application No. 15170702.3.

\* cited by examiner

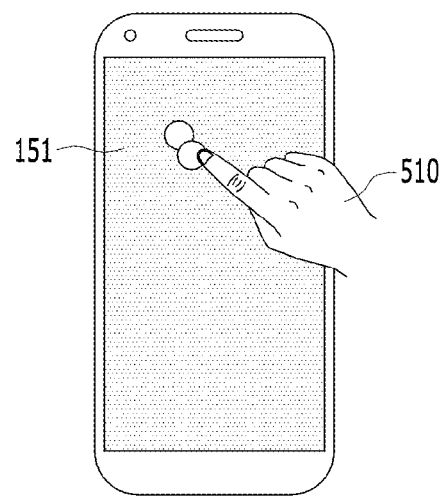
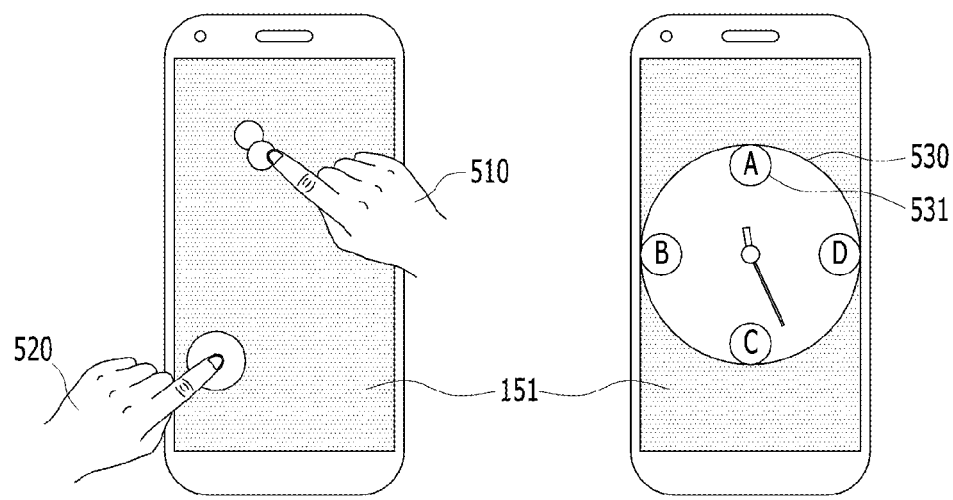
FIG. 5

FIG. 6
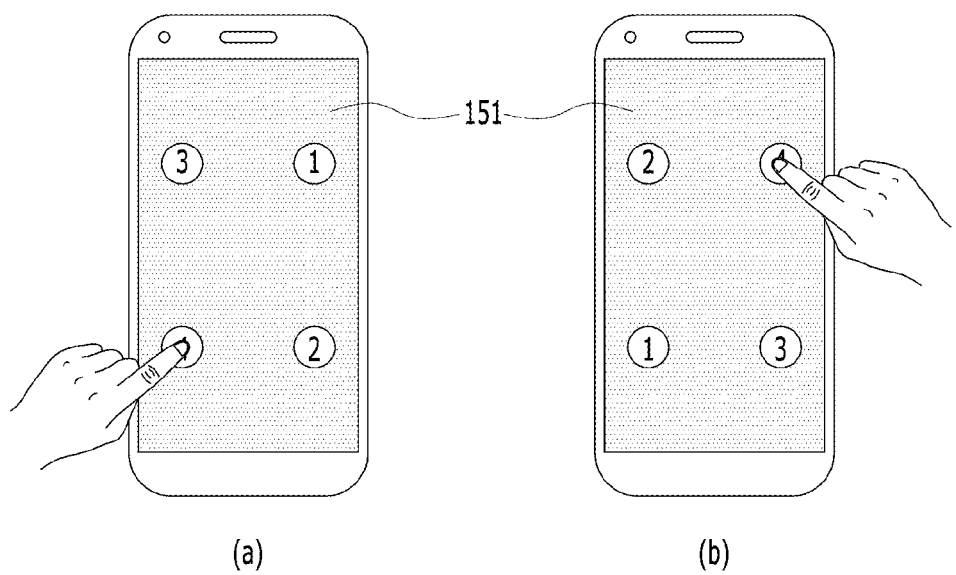
(a)  (b)
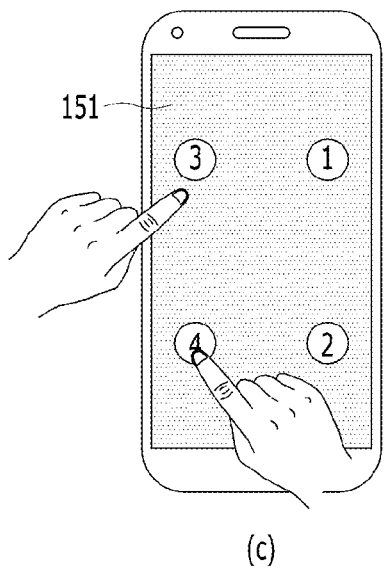
(c)

(a)　　　　　　　　(b)

FIG. 10
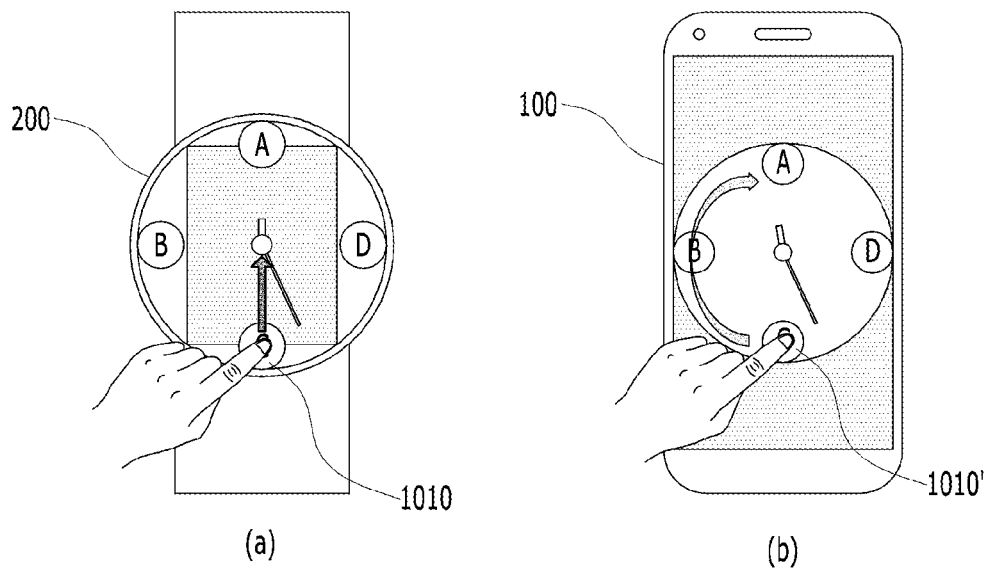
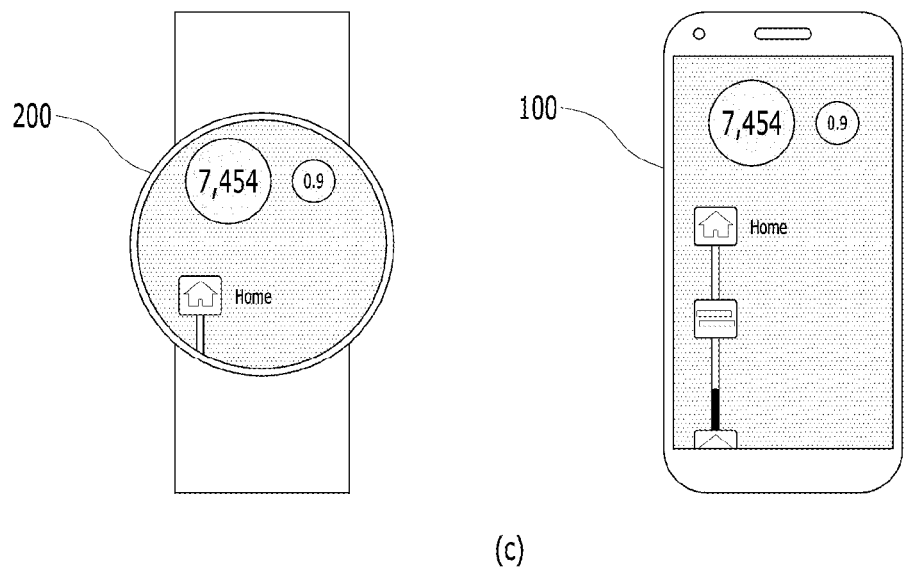
(c)

FIG. 13
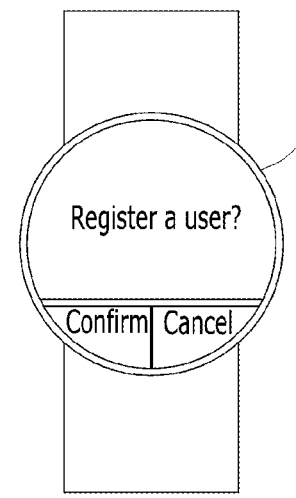
(a)
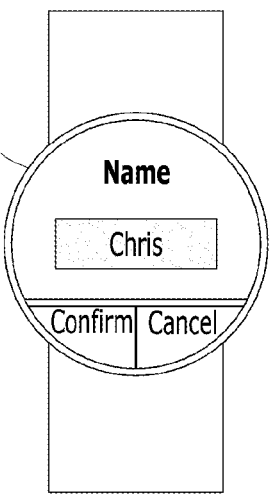
(b)
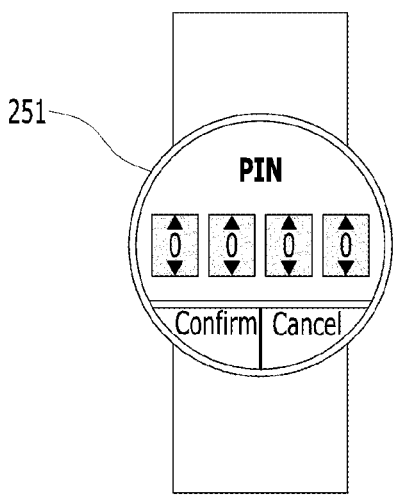
(c)
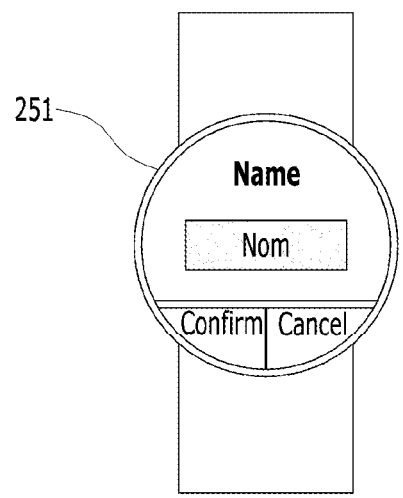
(d)

FIG. 17
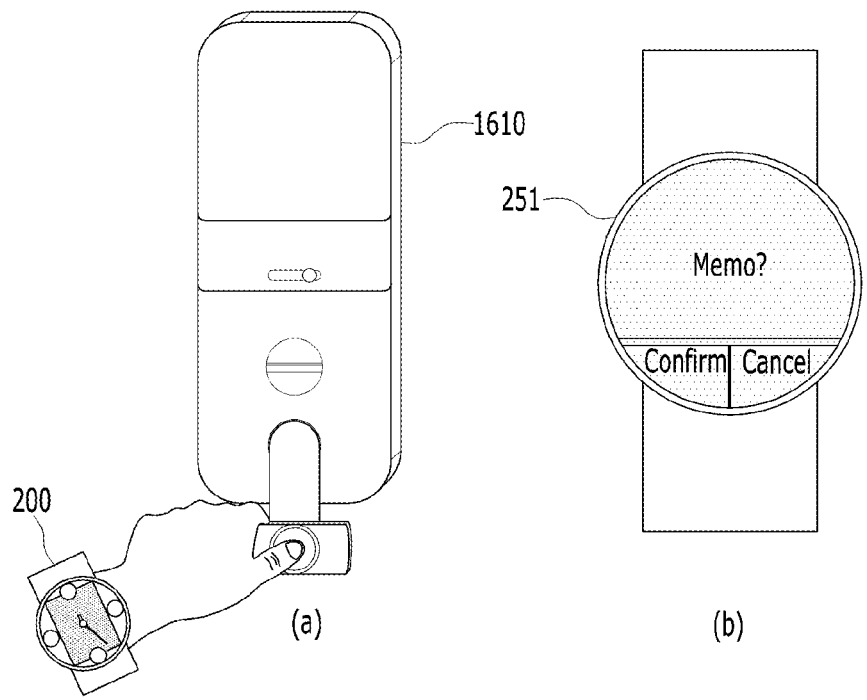
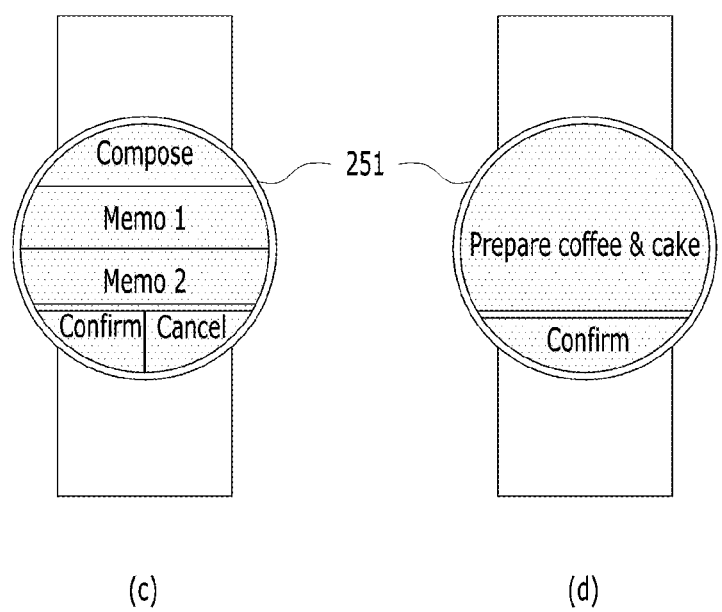

FIG. 21
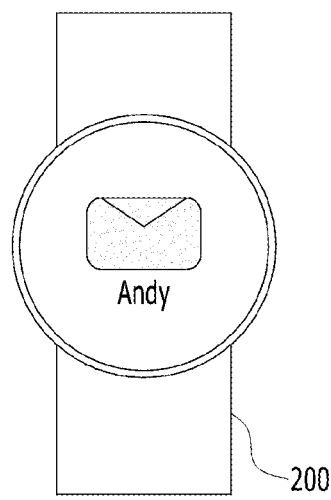
(a)
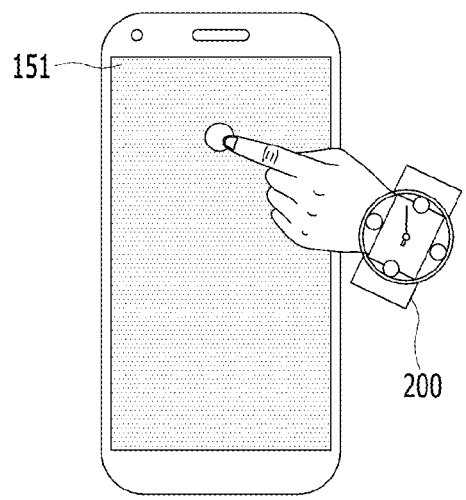
(b)
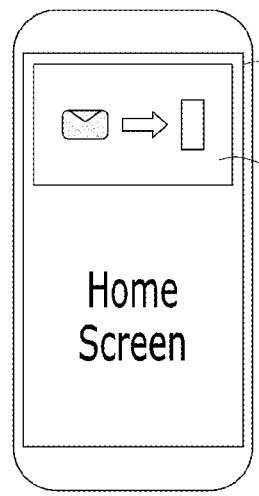
(c)
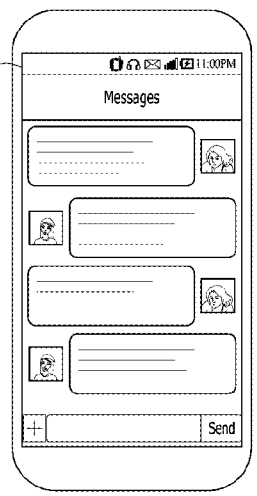
(d)

FIG. 24
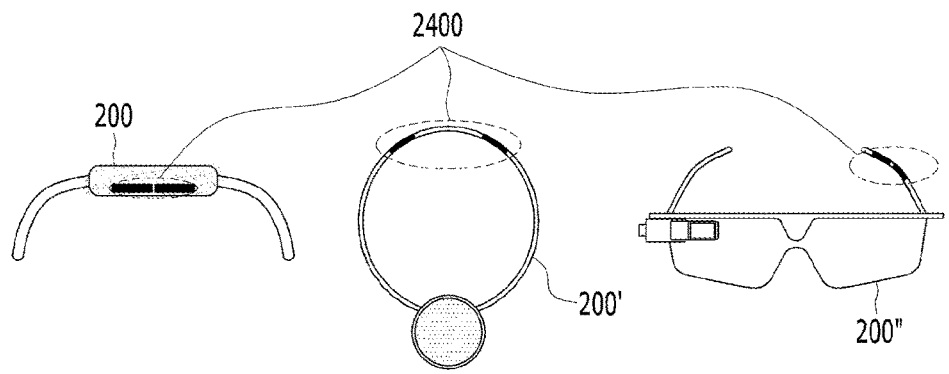
(a)
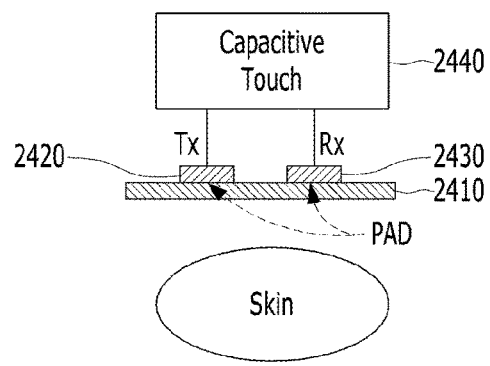
(b)
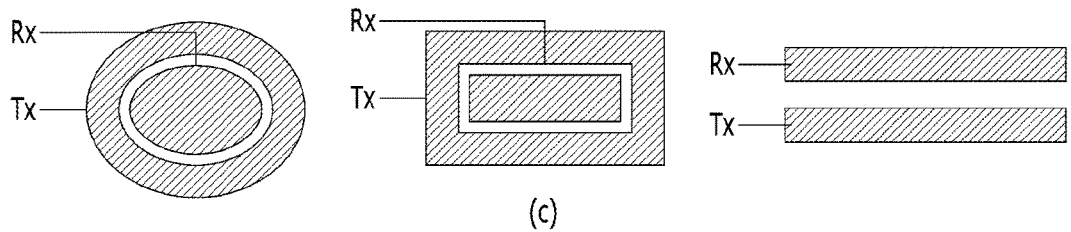
(c)
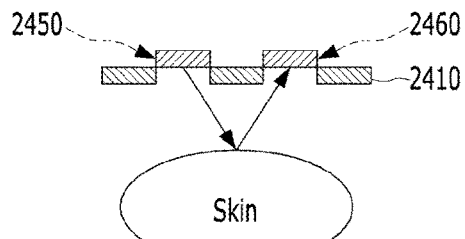
(d)

FIG. 25
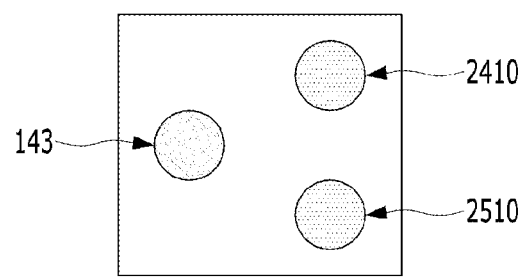
(a)
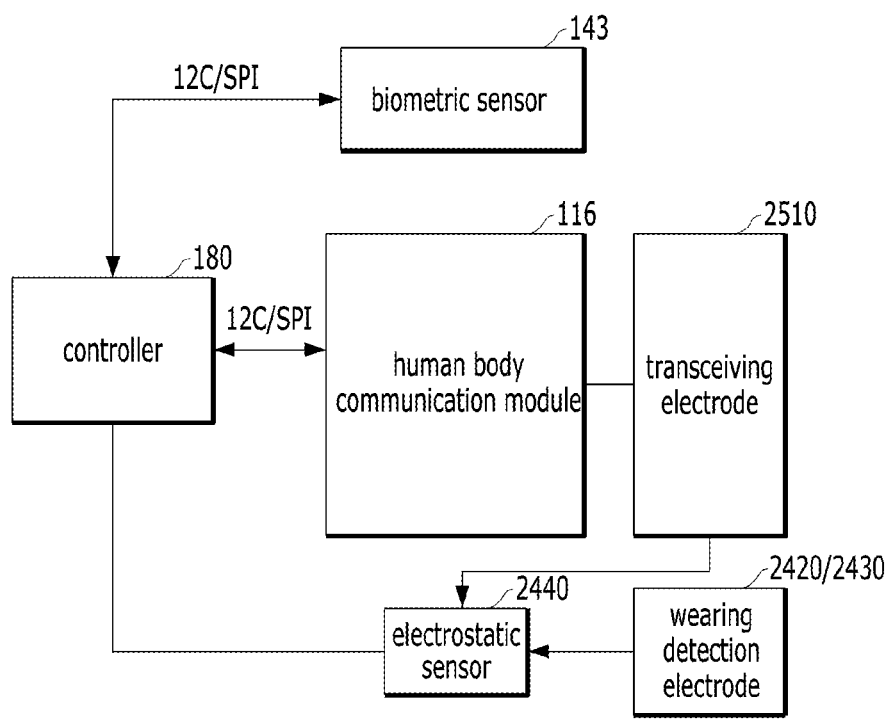
(b)

MOBILE TERMINAL AND CONTROLLING METHOD THEREOF

CROSS-REFERENCE TO RELATED APPLICATION(S)

Pursuant to 35 U.S.C. § 119(a), this application claims the benefit of earlier filing date and right of priority to Korean Application No. 10-2014-0068563, filed on Jun. 5, 2014, the contents of which are hereby incorporated by reference herein in their entirety.

BACKGROUND

1. Field

The present disclosure relates to a mobile terminal, and more particularly, to a mobile terminal and controlling method thereof. Although the present disclosure is suitable for a wide scope of applications, it is particularly suitable for providing various convenience functions in association with a device contacted with or proximate to a user's body to enable a human body communication.

2. Background

Generally, terminals can be classified into mobile/portable terminals and stationary terminals. The mobile terminals can be further classified into handheld terminals and vehicle mount terminals according to possibility of user's direct portability.

As functions of the terminal are getting diversified, the terminal tends to be implemented as a multimedia player provided with composite functions such as photographing of photos or videos, playback of music or video files, game play, broadcast reception and the like for example.

To support and increase the terminal functions, it may be able to consider the improvement of structural parts and/or software parts of the terminal.

Recently, wearable devices of various types tend to interwork with a mobile terminal such as a smartphone. A mobile terminal of a watch type can be taken as one example of a wearable device but a function of the watch type mobile terminal is just limited to a relay role of an input/output means for performing a function of a mobile terminal in part. Particularly, in order to exchange user-desired information between a wearable device and a mobile terminal, it causes a problem that a cumbersome manipulating process such as a process for running a separate application for managing the wearable device in the mobile terminal is required.

SUMMARY

Accordingly, the present disclosure is directed to a mobile terminal and controlling method thereof that substantially obviate one or more problems due to limitations and disadvantages of the related art.

An object of the present disclosure is to provide a mobile terminal and controlling method thereof, by which more convenient functions can be provided in a manner of being connected to a wearable device.

Particularly, one object of the present disclosure is to provide a mobile terminal and controlling method thereof, by which information exchange and function performance can be conveniently achieved between the mobile terminal and a wearable device through a human body communication.

Another object of the present disclosure is to provide a mobile terminal and controlling method thereof, by which an event occurring in a wearable device can be conveniently processed in the mobile terminal through a human body communication.

Technical tasks obtainable from the present disclosure are non-limited by the above-mentioned technical tasks. And, other unmentioned technical tasks can be clearly understood from the following description by those having ordinary skill in the technical field to which the present disclosure pertains.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a mobile terminal according to one embodiment of the present disclosure may include a human body communication unit, a touch screen, and a controller, if a $1^{st}$ touch is inputted to the touchscreen and a $2^{nd}$ touch is then inputted by maintaining the $1^{st}$ touch, controlling a device information to be exchanged with a device worn by a user by a human body communication through the human body communication unit to enable the human body communication through a body of the user while at least one of the $1^{st}$ touch and the $2^{nd}$ touch is maintained, the controller controlling information of the device work by the user to be displayed on the touchscreen using the exchanged device information.

In another aspect of the present disclosure, as embodied and broadly described herein, a method of controlling a mobile terminal according to another embodiment of the present disclosure may include the steps of if a $1^{st}$ touch is inputted to a touchscreen and a $2^{nd}$ touch is then inputted by maintaining the $1^{st}$ touch, exchanging a device information with a device worn by a user by a human body communication through a body of the user to enable the human body communication through a body of the user while at least one of the $1^{st}$ touch and the $2^{nd}$ touch is maintained and displaying information of the device work by the user on the touchscreen using the exchanged device information.

Accordingly, the present disclosure provides the following effects and/or features.

First of all, a mobile terminal and a wearable device are connected to each other through a human body communication, thereby providing various convenience functions.

Secondly, information exchanges and function executions between a mobile terminal and a wearable device can be intuitively performed in various situations.

Thirdly, while a wearable device is put on, by contacting a mobile terminal and a human body to each other through a situation recognition and a gesture only, an event occurring in the wearable device can be processed in the mobile terminal through a linkage or a task transfer can be performed.

Effects obtainable from the present disclosure may be non-limited by the above mentioned effect. And, other unmentioned effects can be clearly understood from the following description by those having ordinary skill in the technical field to which the present disclosure pertains.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The embodiments will be described in detail with reference to the following drawings in which like reference numerals refer to like elements wherein:

FIG. 5 is a diagram for one example of a configuration for inputting a $1^{st}$ touch and a $2^{nd}$ touch in a mobile terminal according to one embodiment of the present disclosure;

FIG. 6 is a diagram for another example of a configuration for inputting a $1^{st}$ touch and a $2^{nd}$ touch in a mobile terminal according to one embodiment of the present disclosure;

FIG. 10 is a diagram for one example of a configuration for running a function mapped to a $3^{rd}$ touch if identification information of a mobile terminal and a wearable device are matched according to one embodiment of the present disclosure;

FIG. 13 is a diagram for one example of a process for performing a user registration in a wearable device according to one embodiment of the present disclosure;

FIG. 17 is a diagram for another example of a configuration for performing a linkage function depending on a presence or non-presence of a registration of a door lock in wearable device according to one embodiment of the present disclosure;

FIG. 21 is a diagram for one example of a method of checking an occurring event in a mobile terminal by wearing a wearable device according to another embodiment of the present disclosure;

FIG. 24 is a diagram for one example of a method of determining whether a wearable device is worn, applicable to embodiments of the present disclosure;

FIG. 25 is a diagram for one example of a disposed structure of sensors and electrodes of a human body communication module, applicable to embodiments of the present disclosure.

DETAILED DESCRIPTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1:
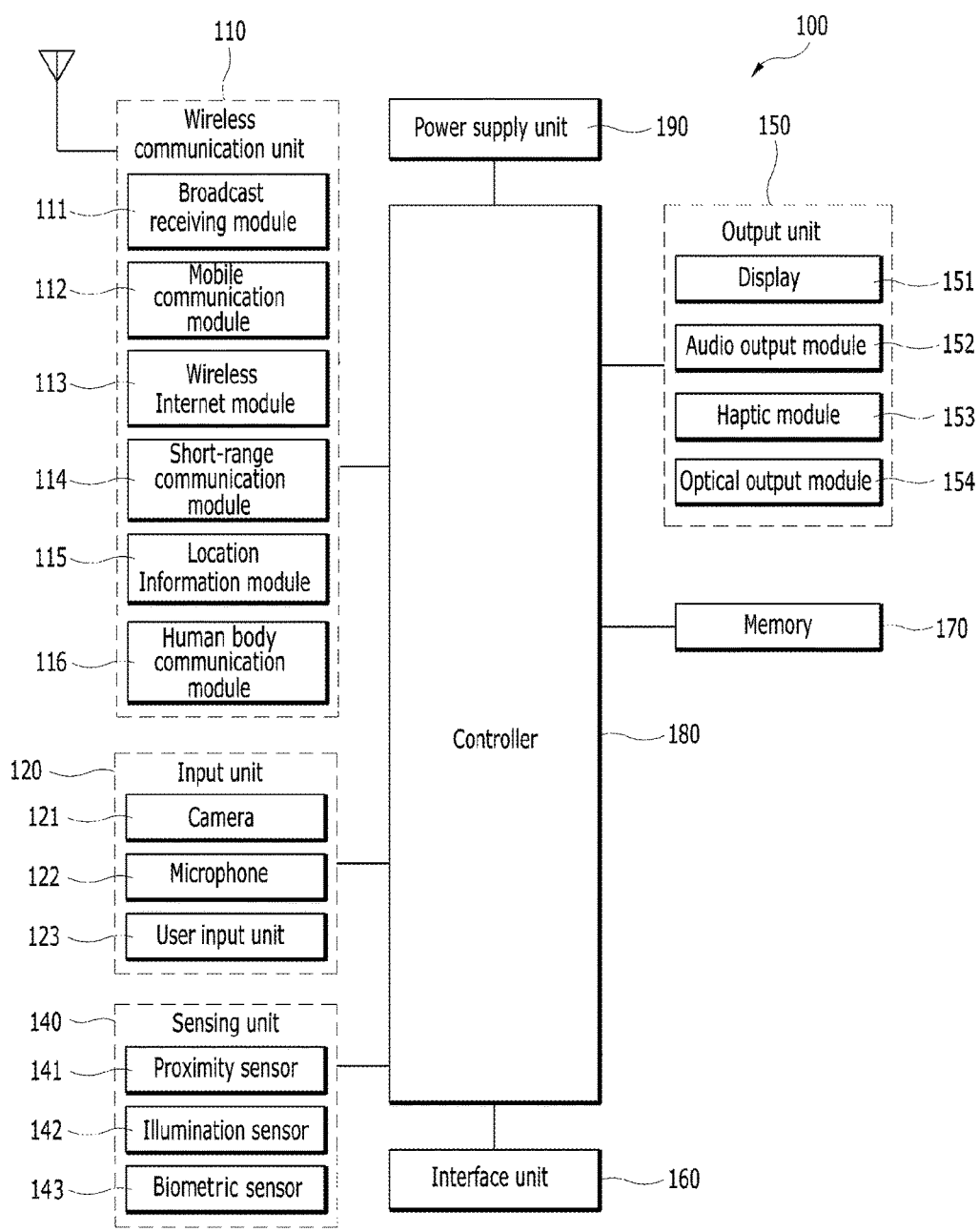
FIG. 1 is a block diagram to describe a mobile terminal according to one embodiment of the present disclosure.
Figure 2A:
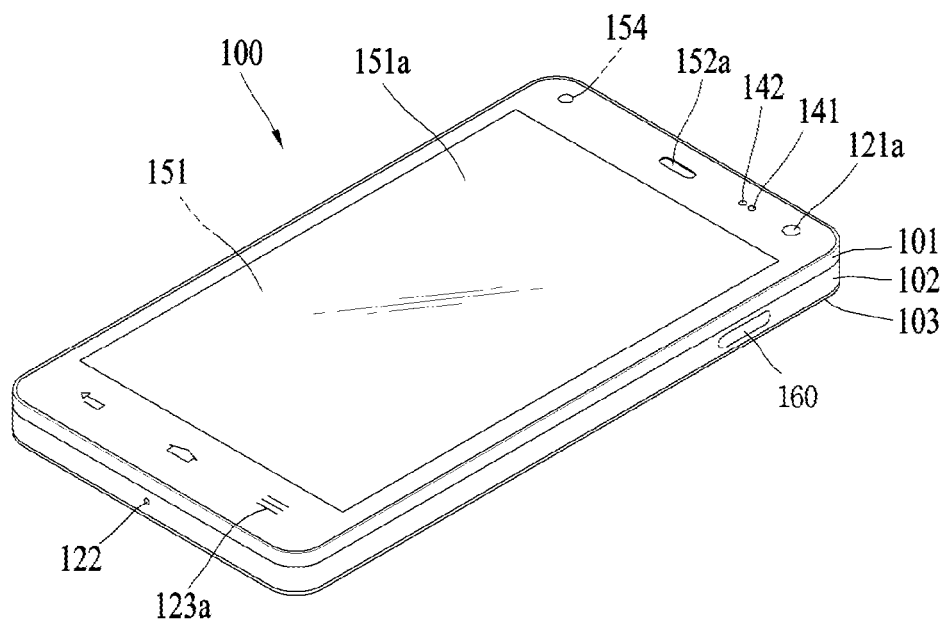
FIG. 2A and FIG. 2B are diagrams for configurations of one example of a mobile terminal according to one embodiment of the present disclosure in different views, respectively.
Figure 2B:
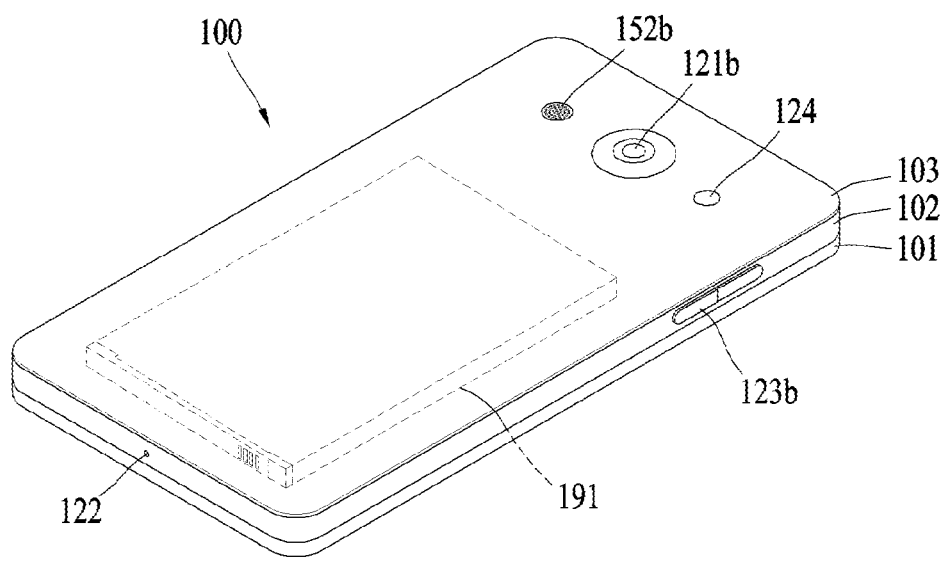

Reference is now made to FIGS. 1-2B, where FIG. 1 is a block diagram of a mobile terminal in accordance with the present disclosure, and FIGS. 2A and 2B are conceptual views of one example of the mobile terminal, viewed from different directions.

According to the present disclosure, various functions are provided through linked operations between a mobile terminal and a wearable device. Therefore, a configuration of a watch type wearable device is described as one example of a wearable device to which the present disclosure is applicable.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, a location information module 115, and a human body communication module 116.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141, an illumination sensor 142 and a biometric sensor 143 (means for detecting whether the mobile terminal is worn by a user).

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1-2B according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

The human body communication module 116 is configured to perform human body communication using the human body as the transmission medium enables wireless communication without transmitting radio waves through the air. The human body communication module 116 may have electrodes for transceiving signal via the human body when contacted to the same. The electrodes may be dedicated for the human body communication module, or be shared with other sensors (e.g., the biometric sensor 116, wearing detection means and/or the touchscreen 151).

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 may receive external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 2A and 2B, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 2A and 2B depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 2A illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 2B, a flash 124 is shown adjacent to the second camera 121b. When an image of a subject is captured with the camera 121b, the flash 124 may illuminate the subject.

As shown in FIG. 2A, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

According to the present disclosure, various functions are provided through mutual linkage between the aforementioned mobile terminal and the wearable device. In the following description, as one example of a wearable device applicable to the present disclosure, a configuration of a watch type wearable device is described in detail.

Figure 3:
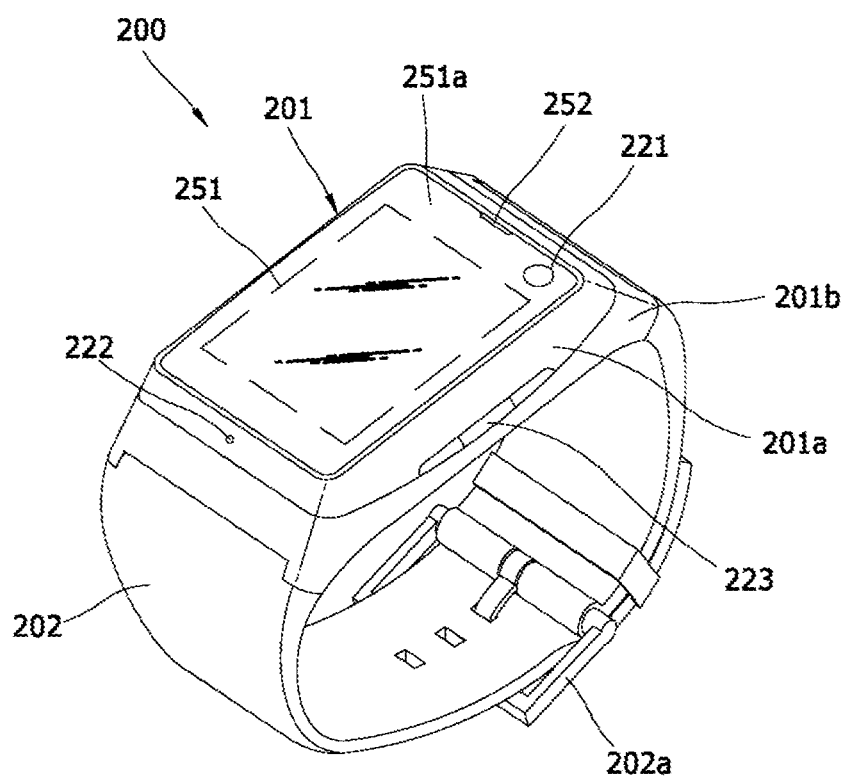
FIG. 3 is a perspective diagram for one example of a wearable device 200 of a watch type in connection with another one embodiment of the present disclosure.

FIG. 3 is a perspective diagram for one example of a wearable device 200 of a watch type in connection with another one embodiment of the present disclosure.

Referring to FIG. 3, a wearable device 200 of a watch type includes a main body 201 with a touchscreen 251 and a band 202 connected to the main body 201 to be wearable on a wrist.

The main body 201 may include a case having a certain appearance. As illustrated, the case may include a first case 201a and a second case 201b cooperatively defining an inner space for accommodating various electronic components. Other configurations are possible. For instance, a single case may alternatively be implemented, with such a case being configured to define the inner space, thereby implementing a wearable device 200 with a uni-body.

The watch type wearable device 200 can perform a wireless communication and a human body communication, and an antenna for the wireless communication and an electrode for the human body communication can be installed in the main body 201. The antenna may extend its function using the case. For example, a case including a conductive material may be electrically connected to the antenna to extend a ground area or a radiation area.

The touchscreen 251 is shown located at the front side of the main body 201 so that displayed information is viewable to a user. Through the touchscreen 251, a touch input can be detected. As illustrated, a window 251a of the touchscreen 251 is positioned on the first case 201a to form a front surface of the terminal body together with the first case 201a.

The illustrated embodiment includes an audio output module 252, a camera 221, a microphone 222, and a user input unit 223 positioned on the main body 201 if necessary.

The band 202 is configured to be commonly worn on the user's wrist and may be made of a flexible material for facilitating wearing of the device. As one example, the band 202 may be made of leather, rubber, silicon, synthetic resin, or the like. The band 202 may also be configured to be detachable from the main body 201. Accordingly, the band 202 may be replaceable with various types of bands according to a user's preference.

In one configuration, the band 202 may be used for extending the performance of the human body communication or the radio antenna. For example, the band may 202 include therein a ground extending portion (not shown) electrically connected to the antenna to extend a ground area and may also include an electrode for the human body communication.

The band 202 may include a fastener 202a. The fastener 202a may be implemented into a buckle type, a snap-fit hook structure, a Velcro® type, or the like, and include a flexible section or material. The drawing illustrates an example that the fastener 202a is implemented using a buckle.

Moreover, it is a matter of course that the watch type wearable device includes a controller (not shown in the drawing) for controlling the respective components configuring the wearable device and making a decision and processing for each function mentioned in the following. It is a matter of course that the present disclosure is applicable to wearable devices of various types such as a bracelet type, a glasses type, a necklace type and the like. In this case, the components shown in FIG. 3 can be provided by being differently disposed to fit the wearing form.

For clarity and convenience of the following description, assume that a mobile terminal mentioned in the following description includes at least one of the components shown in FIG. 1. Moreover, a graphic shape such as an arrow or a finger for indicating a specific object or selecting a menu on the display unit 151 is generally named a pointer or a cursor. Yet, the pointer may be interchangeably used to mean a finger, a stylus pen or the like for a touch manipulation or the like. Hence, in order to distinguish a pointer and a cursor from each other, a graphic displayed on the display unit 151 shall be named a cursor, while such a physical means for performing a touch, a proximity touch, a gesture or the like as a finger or a stylus pen shall be named a pointer.

A mobile terminal is able to perform a data exchange for performing an interworking function, which will be described later, by being connected to a wearable device through a short range communication (e.g., Bluetooth, etc.), a wireless internet or the like. Each function mentioned in the following description can be run through at least one application. In particular, at least two applications may be run together to run a single function, or the corresponding function may be run through a single application.

Running a Linkage Function Between a Mobile Terminal and a Wearable Device Through Human Body Communication According to one embodiment of the present disclosure, a mobile terminal and controlling method thereof are provided as follows. First of all, while a device equipped with a human body communication function is contacted with or proximate to a user's body to enable a human body communication, if the user's body is contacted with a mobile terminal through a specific gesture, information of the corresponding device and the mobile terminal are exchanged through the human body communication, through which various functions can be performed.

In this case, the human body communication is the technology of using a current flowing through a human body without considerable separate power consumption by utilizing a human body as a medium material such as a wire or the like. Thus, the human body communication means a communication system capable of transmitting data such as a photo, a video, a music file and the like using a human body (e.g., an arm, a leg, etc.). As one example of the standard of this communication system, it is able to take the standard (IEEE 802.15.6) for a communication between electronic devices or biosensors in a peripheral area of a human body. The present standard mainly concerns a UWB (ultra wideband) technology using a radio frequency, an NB (narrow band) technology using a radio frequency and a human body communication technology using a human body medium. Of course, the present standard is just exemplary. The present disclosure is applicable to other standard and/or non-standard communication protocols that regulate the human body communication systems.

In the present specification, for clarity of the following description, a device currently contacted with or proximate to a user's body to enable a human body communication is assumed as 'wearable device worn by a user (or, user-worn wearable device)'. And, it is apparent to those skilled in the art that a device capable of a human body communication is non-limited by its configuration or name.

Figure 4:
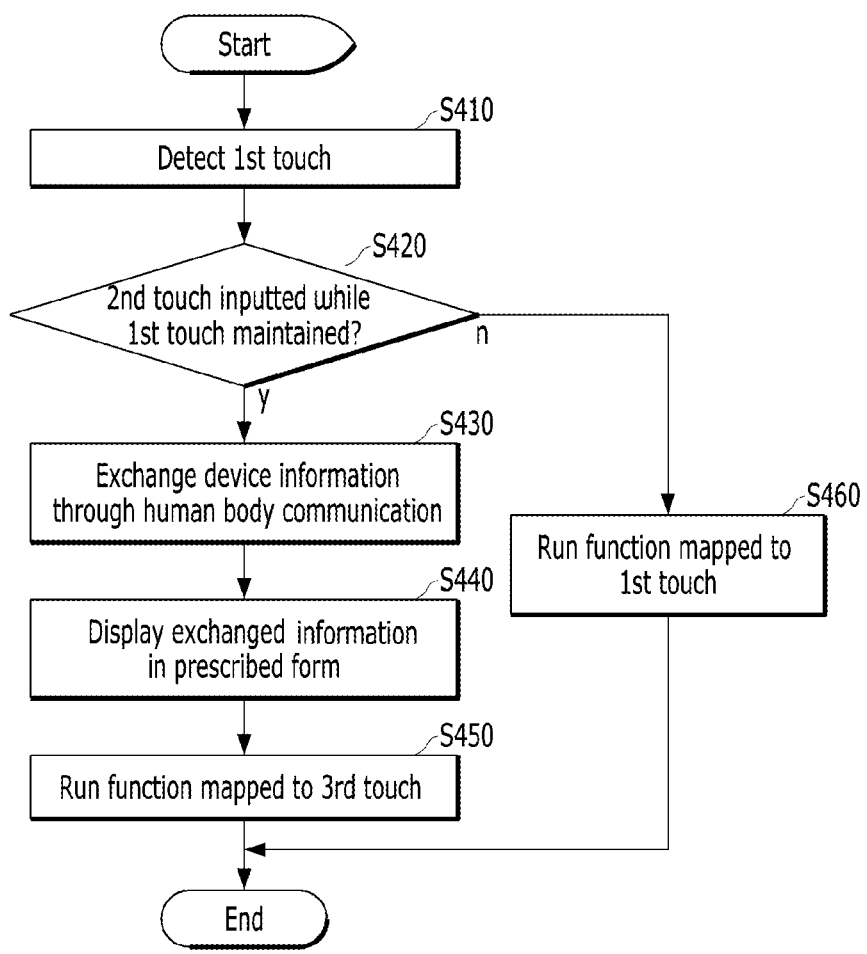
FIG. 4 is a flowchart for one example of a process for exchanging information with a wearable device and performing a linkage function through a human body communication in a mobile terminal according to one embodiment of the present disclosure.

The following description is made with reference to FIG. 4.

FIG. 4 is a flowchart for one example of a process for exchanging information with a wearable device and performing a linkage function through a human body communication in a mobile terminal according to one embodiment of the present disclosure.

In FIG. 4, assume that a user is wearing a wearable device. And, assume that each of a wearable device and a mobile terminal includes a human body communication module configured to perform a human body communication. In this case, 'wearing a wearable device' does not mean that the wearable device is simply worn on a user's body. Instead, 'wearing a wearable device' may mean a state that an electrode connected to (or included in) a human communication unit is contacted with a user's body to enable a human body communication or a state that the electrode is proximate to the user's body enough to enable the human body communication without direct contact [e.g., the wearable device is worn on clothes, etc.]. Moreover, assume that the mobile terminal is in a state that an electrode for a human body communication is connected to the touchscreen (i.e. a data path for the human body communication with the wearable device can be established if a user's body is simply contacted with the touchscreen).

Referring to FIG. 4, a $1^{st}$ touch to the touchscreen can be detected [S410]. In doing so, the touchscreen may be in a turned-off state or a turned-on state. In particular, the turned-off state of the touchscreen including a touch sensor and a display may mean a state that an input of a touch with a pointer can be detected owing to the activated touch sensor despite that no image is turned on the display. Owing to one of various reasons including an alarm/communication event occurrence, a user's key button manipulation and the like, if a power key button is manipulated in the turned-on state of the display or there is no event occurrence or key button manipulation for predetermined duration after turning on the display, the controller 180 can control the display to be turned off. The turned-on state of the touchscreen may include a state that a specific application accompanied with a communication preparation/activation of a human body communication module is currently run or a state that a specific mode is activated.

In particular, irrespective of whether the touchscreen is turned on, the controller 180 can monitor whether a human body contact is performed on the touchscreen until detecting a $1^{st}$ touch input by maintaining the human body communication module 116 in a standby state or an activated state in accordance with an application, a mode, or a setting. In this case, the standby state may mean a state that the preparation (e.g., a power ON, an initialization, etc.) for operating the human body communication module is finished. And, the activated state may mean a state that a data transmission/reception of a human body communication system is enabled as soon as a human body is touched with an electrode for a human body communication detection.

While the human body communication module 116 is in the activated state, a data exchange through a human body communication can be directly performed while a $1^{st}$ touch and/or a $2^{nd}$ touch is inputted. When the human body communication module 116 is in the standby state, if the $1^{st}$ touch is detected, the controller 180 can switch the human body communication module 116 to the activated state from the standby state.

While the $1^{st}$ touch is maintained on the touchscreen without being released, if the $2^{nd}$ touch is inputted [S420], the controller 180 recognizes it as a command for a human body communication initiation and is able to control the human body communication module 116 to exchange its information and information of the wearable device by a human body communication [S430].

In this case, the $1^{st}$ touch may be inputted to a random point on the touchscreen and the $2^{nd}$ touch is preferably inputted to a point different from the $1^{st}$ touch inputted point in a predetermined pattern. In this case, the predetermined pattern of the $2^{nd}$ touch may be equal to or different from a pattern for turning on the touchscreen or a pattern for releasing a lock screen. If the predetermined pattern of the $2^{nd}$ touch is different from the pattern for turning on the touchscreen or releasing the lock screen, it may be able to consider skipping the $1^{st}$ touch.

Moreover, the exchanged information may include at least one of an identification information of each device, an information on an installed application, an information on a running state of a currently run application, an information on types (e.g., a watch type, a necklace type, a glasses type, a pad type, etc.) of a wearable device and other movable devices, an information of wireless communication capability for a data path establishment through another wireless communication unit 110, a security information (e.g., a MAC address of a communication module, an IP address, a network ID, a connection password, etc.) for the data path establishment and the like.

As the information exchange is performed, the controller 180 can display information of the wearable device worn by a user in a prescribed form [S440]. If there is a security/privacy attribute set information (i.e., a presence or non-presence of disclosure) in a device information exchange process or an information disclosure is set to be differentially performed depending on association (e.g., whether an item corresponding to an identification information is saved in a phonebook, belongs to the same user, or uses the same identification information, etc.) for each device, the corresponding information may not be displayed or may be displayed distinguishably through a prescribed visual effect.

Unlike the above description, the present step may be configured in a following manner. First of all, when the $1^{st}$ touch is detected, the information exchange performed in the step S430 is finished in advance. Secondly, when the $2^{nd}$ touch is inputted, the information display of the step S440 is performed.

Thereafter, if a $3^{rd}$ touch is inputted to the information of the wearable device displayed on the touchscreen, a function corresponding to the $3^{rd}$ touch can be run in association with the wearable device. In this case, the runnable function may include a function of running an application installed on the wearable device, a function of reading/downloading/synchronizing application information, a function of installing/removing an application, or the like. Of course, the $3^{rd}$ touch may include a command corresponding to a security release procedure for reading a security/privacy attribute set information.

On the other hand, if the information (e.g., a communication system) on the wireless communication unit 110 is exchanged in the step S430, the controller 180 determines a wireless communication system commonly supported by both of the mobile terminal and the wearable device and is then able to establish a data path through the determined wireless communication system. Once the data path is established, if a data exchange is required for an operation performed after the step S430, the data exchange can be performed not by the human body communication but by the wireless communication. Alternatively, only if the controller 180 determines that the user's body on which the wearable device is worn is not contacted with the touchscreen (i.e., the human body communication is not available) after the step S430, the data exchange through the wireless communication unit may be performed. In this case, it is a matter of course that the data exchange can be stably performed despite that the user's body contact with the mobile terminal is not maintained.

If the $1^{st}$ touch is ended without an input of the $2^{nd}$ touch, the controller 180 can run a function corresponding to the $1^{st}$ touch simply [S460].

In the following descriptions, the application managing method described with reference to FIG. 4 is further described in detail. In the following descriptions, 'a touchscreen is turned off' means that a touch detection function is enabled despite that a display function of the touchscreen is turned off.

FIG. 5 is a diagram for one example of a configuration for inputting a $1^{st}$ touch and a $2^{nd}$ touch in a mobile terminal according to one embodiment of the present disclosure.

As mentioned in the foregoing description, a predetermined pattern of a $2^{nd}$ touch may be equal to or different from a pattern for releasing a lock screen. Described with reference to FIG. 5 is the case that a predetermined pattern of a $2^{nd}$ touch is equal to a pattern for releasing a lock screen.

For instance, referring to FIG. 5 (*a*), while the touchscreen 151 is turned off, if the touchscreen 151 is consecutively knocked twice with a finger 510 in a prescribed time, the touchscreen 151 can be turned on. This method of turning on the touchscreen shall be named 'knock on' for clarity of the description. On the other hand, while a touch contact (i.e., a $1^{st}$ touch) with the touchscreen 151 through one finger 520 is maintained, if the touchscreen 151 is consecutively touched twice with another finger 510 [i.e., a $2^{nd}$ touch] [FIG. 5 (*b*)], the touchscreen 151 is turned on and information of a watch type wearable device worn by a user can be displayed in a watch shape 530 on the touchscreen 151 [FIG. 5 (*c*)]. The hands of a watch corresponding to a current hour can be displayed within the watch shape 530 and a plurality of icons/indicators 531 can be displayed on a dial edge of the watch. Each of the icons or indicators may correspond to a single application installed on the wearable device or an application group including a plurality of applications installed on the wearable device and may indicate an operating state of the wearable device. Regarding the number of the icons/indicators, a preset number of icons/indicators may be displayed only in order of recent use or priority set by a user or other icons/indicators may be displayed by a scroll. In the present specification, assume that the icons/indicators are configured in a manner that alphabets are displayed within a circle. If alphabets are different from each other, they are assumed as indicating different types. If alphabets are equal to each other, they are assumed as indicating the same type. These assumptions are made for clarity of the description. And, it is apparent to those skilled in the art that the present disclosure is non-limited by the shape and disposed location of the icon/indictor. Moreover, the reason for the wearable device information, which is displayed through the $1^{st}$ touch and the $2^{nd}$ touch, to be displayed to correspond to the shape of the corresponding device is to facilitate the corresponding device to be visually identified. Hence, it is not necessary for the wearable device information to correspond to the shape of the corresponding device. Meanwhile, if a specific icon is selected, details (e.g., size, origin, authority, running state, storage location, etc.) of an application corresponding to the selected icon or an operating state can be displayed [not shown in the drawings].

FIG. 6 is a diagram for another example of a configuration for inputting a $1^{st}$ touch and a $2^{nd}$ touch in a mobile terminal according to one embodiment of the present disclosure.

As mentioned in the foregoing description, a predetermined pattern of a $2^{nd}$ touch may be equal to or different from a pattern for releasing a lock screen. Described with reference to FIG. 6 is the case that a predetermined pattern of a $2^{nd}$ touch is different from a pattern for releasing a lock screen.

Referring to FIG. 6 (a), while the touchscreen 151 is turned off, if 4 points are touched in predetermined order (e.g., 1 to 4), a lock screen can be released as soon as the touchscreen 151 is turned on. In doing so, the 4 points denoted by the numerals are provided to help the understanding and are not actually displayed on the touchscreen. Moreover, it is a matter of course that the order, point and number are changeable.

On the other hand, a pattern for displaying a currently connected wearable device can be set to a pattern different from that for simply turning on the touchscreen in touch order and point. For instance, while the touchscreen is turned off, if touch inputs applied to 4 points in the numeral order shown in FIG. 6 (b) are detected, information of the wearable device currently worn by a user can be displayed in the manner similar to that shown in FIG. 5 (c).

Of course, referring to FIG. 6 (c), while a touch state (i.e., $1^{st}$ touch) at a random point on the touchscreen is maintained, if a touch (i.e., $2^{nd}$ touch) is inputted in the pattern shown in FIG. 6 (a), the wearable device information received through a human body communication during the finger contact can be displayed.

Figure 7:
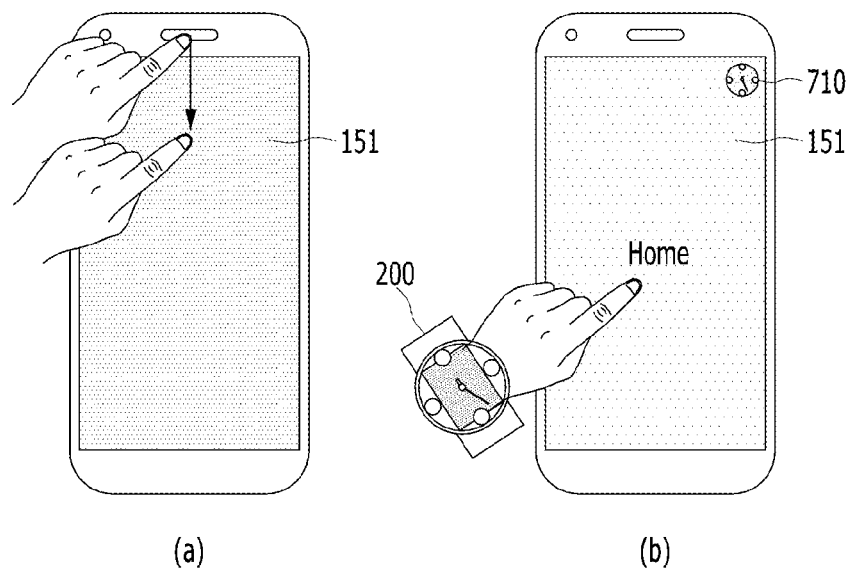
FIG. 7 is a diagram for one example of a command inputting method for displaying information of a user-worn wearable device in a mobile terminal according to one embodiment of the present disclosure.

FIG. 7 is a diagram for one example of a command inputting method for displaying information of a user-worn wearable device in a mobile terminal according to one embodiment of the present disclosure.

Referring to FIG. 7 (a), without distinguishing a $1^{st}$ touch and a $2^{nd}$ touch from each other, while the touchscreen 151 is turned off, if a touch input applied from a top end of the touchscreen (or a top end of a bezel of a main body) to a bottom end of the touchscreen is detected, the controller 180 turns on the touchscreen 151 and is also able to display information of a currently connected wearable device through the touchscreen 151.

On the other hand, referring to FIG. 7 (b), while a wearable device 200 is worn by a user, if the touchscreen 151 is turned on, an icon 710 can be displayed on a displayed screen (e.g., a home screen) for a prescribed time. Before the icon 710 disappears, if the icon 710 is selected by a touch input, the controller 180 activates a human body communication module to obtain and display the information of the currently worn wearable device. Of course, while the corresponding icon 710 is displayed, if specific hardware key button(s) is manipulated, the controller 180 can control the information of the currently worn wearable device to be displayed.

A display configuration in accordance with a type of a wearable device is described in detail with reference to FIG. 8 as follows.

Figure 8:
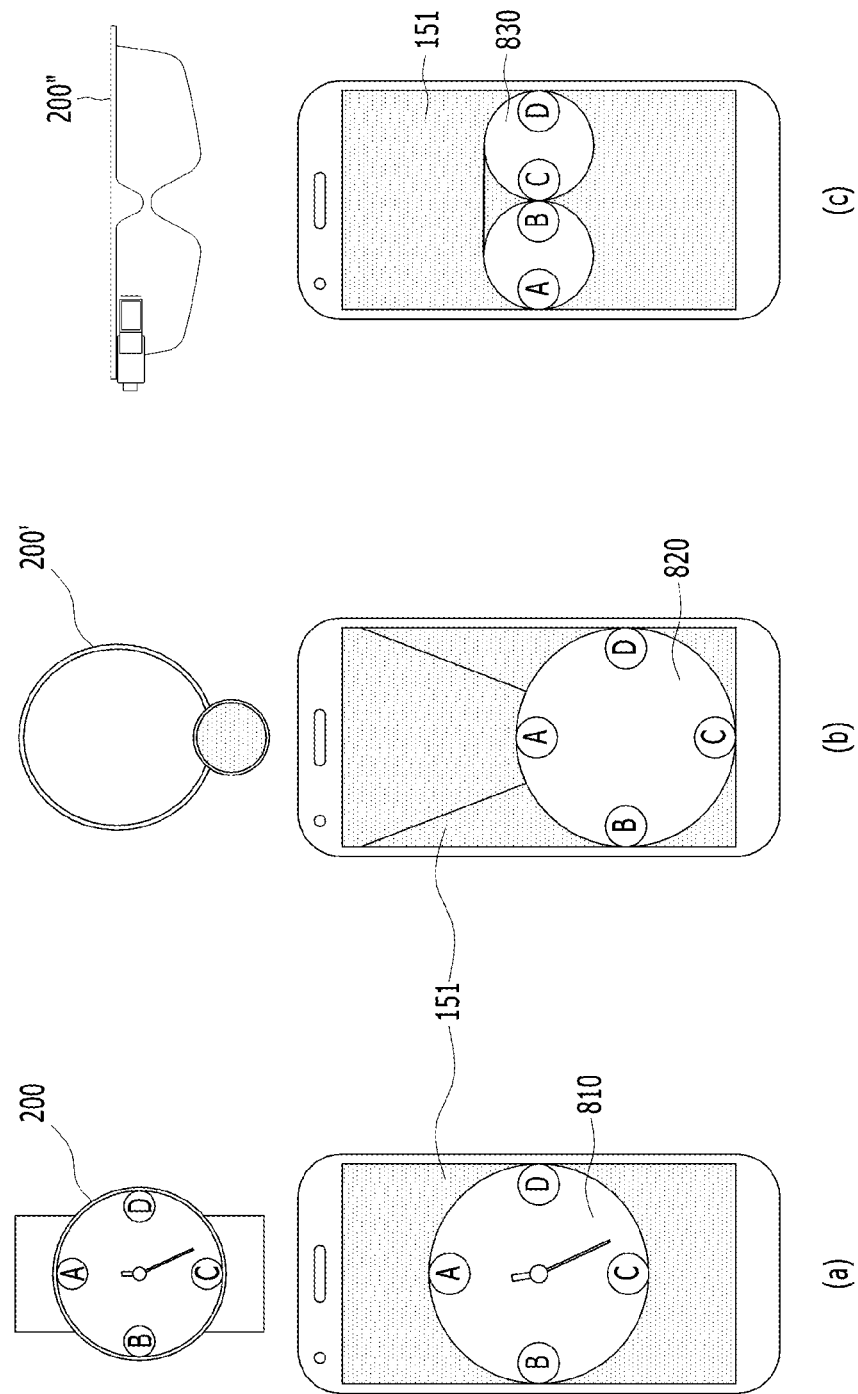
FIG. 8 is a diagram for one example of a configuration for displaying information of a wearable device in accordance with a type of a user-worn wearable device in a mobile terminal according to one embodiment of the present disclosure.

FIG. 8 is a diagram for one example of a configuration for displaying information of a wearable device in accordance with a type of a user-worn wearable device in a mobile terminal according to one embodiment of the present disclosure.

In FIG. 8, assume that a command for displaying information of a currently worn wearable device by one of the methods described with reference to FIGS. 5 to 7 has been inputted.

Referring to FIG. 8 (a), if a wearable device is a watch type 200, information of the wearable device can be displayed within a silhouette of a watch shape 810.

Referring to FIG. 8 (b), if a wearable device is a necklace type 200', information of the wearable device can be displayed within a silhouette of a necklace shape 820.

Referring to FIG. 8 (c), if a wearable device is a glasses type 200", information of the wearable device can be displayed within a silhouette of a glasses shape 830.

When information of a currently worn wearable device is displayed on a mobile terminal, whether the mobile terminal is connected can be displayed on the wearable device as well. This is described in detail with reference to FIG. 9 as follows.

Figure 9:
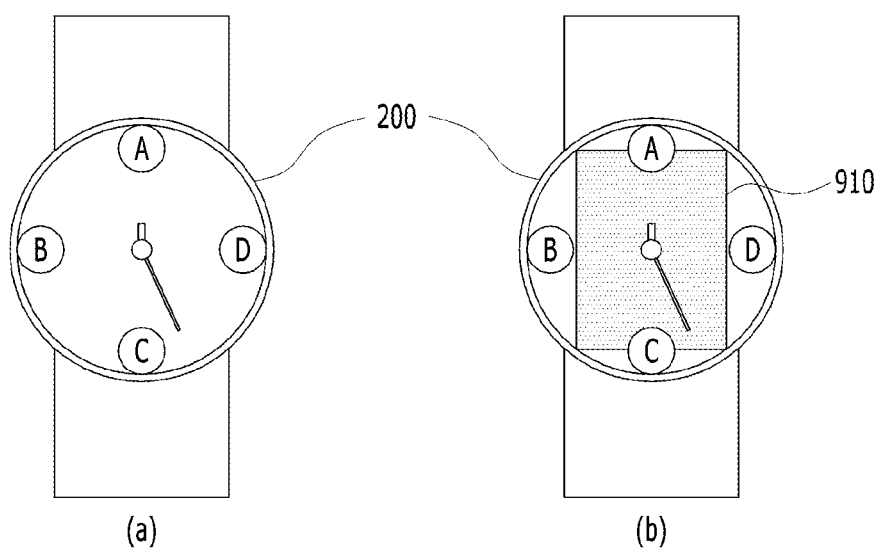
FIG. 9 is a diagram for one example of a configuration for displaying a presence or non-presence of a connection of a mobile terminal in a wearable device according to one embodiment of the present disclosure.

FIG. 9 is a diagram for one example of a configuration for displaying a presence or non-presence of a connection of a mobile terminal in a wearable device according to one embodiment of the present disclosure.

Referring to FIG. 9, if a connection to a mobile terminal through a human body communication with a watch type wearable device 200 is established, a silhouette 910 of a mobile terminal shape shown in FIG. 9 (b) can be displayed within the corresponding watch in the state shown in FIG. 9 (a). Although FIG. 9 shows a case that whether the mobile terminal is connected is represented through the silhouette only, information (e.g., an installed application, etc.) of the mobile terminal can be displayed within the silhouette as well [described later].

Meanwhile, according to the present embodiment, depending on whether an identification information of a wearable device and an identification information of a mobile terminal are equal to each other or whether the identification information are mutually saved, information of the devices can be displayed in different forms. In this case, the identification information may include one of a mobile communication phone number given according to SIM/USIM card, a serial number of a device, a MAC address of a communication module, an account of an operating system (OS) driven in a device, a user information, and the like. The listed identification information are just exemplary. And, the identification information can include every information capable of inter-device identification.

In the following description, a display configuration of a device information according to an identification information and a process for running a function mapped to a $3^{rd}$ touch are described in detail with reference to FIGS. 10 to 12.

FIG. 10 is a diagram for one example of a configuration for running a function mapped to a $3^{rd}$ touch if identification information of a mobile terminal and a wearable device are matched according to one embodiment of the present disclosure.

In FIG. 10, assume that a phone number of a mobile terminal 100 and a phone number of a wearable device are equal to each other or belong to the same user.

Referring to FIG. 10, all icons of the wearable device shown in FIG. 10 (a) are displayed in available state on the touchscreen of the mobile terminal [FIG. 10 (b)].

In doing so, if a specific icon 1010 is the wearable device 200 is dragged centering on the watch as one example of a $3^{rd}$ touch [FIG. 10 (a)] or a corresponding icon 1010' in a silhouette of the wearable device displayed on the mobile terminal is dragged over a predetermined distance in a specific direction as one example of the $3^{rd}$ touch [FIG. 10 (b)], the information corresponding to the icon can be displayed on the wearable device and/or the mobile terminal 100 [FIG. 10 (c), FIG. 10 (d)]. The above-mentioned $3^{rd}$ touch is just exemplary and may include a simple contact touch or a touch of a different type (e.g., a long touch, etc.). When a user drags an icon within a watch silhouette displayed on the mobile terminal to an outside of the watch silhouette, if the dragged icon corresponds to an application, the corresponding application can be installed on the mobile terminal or information of the application can be downloaded to the mobile terminal. If the dragged icon corresponds to a file, the corresponding file can be copied to the mobile terminal.

Meanwhile, icons corresponding to applications installable on a corresponding wearable device can be displayed on a touchscreen region outside a silhouette corresponding to a type of a wearable device. If one of the icons corresponding to the installable applications is dragged & dropped onto an inside of the silhouette from outside, the controller 180 can control an installation command and an installation file (or, a path of an installation file, a downloadable external server address of an installation file, etc.) to be delivered to the wearable device in order to install the application mapped to the corresponding icon on the wearable device.

Of course, the selected and installed application or the moved/copied file is non-limited by the installed/saved one in the mobile terminal or wearable device and may be directly downloaded from an external server. For instance, after a list of application candidates installable on the corresponding device has been received from the external server, if one of the application candidates is selected, application installation can be newly performed.

Figure 11:
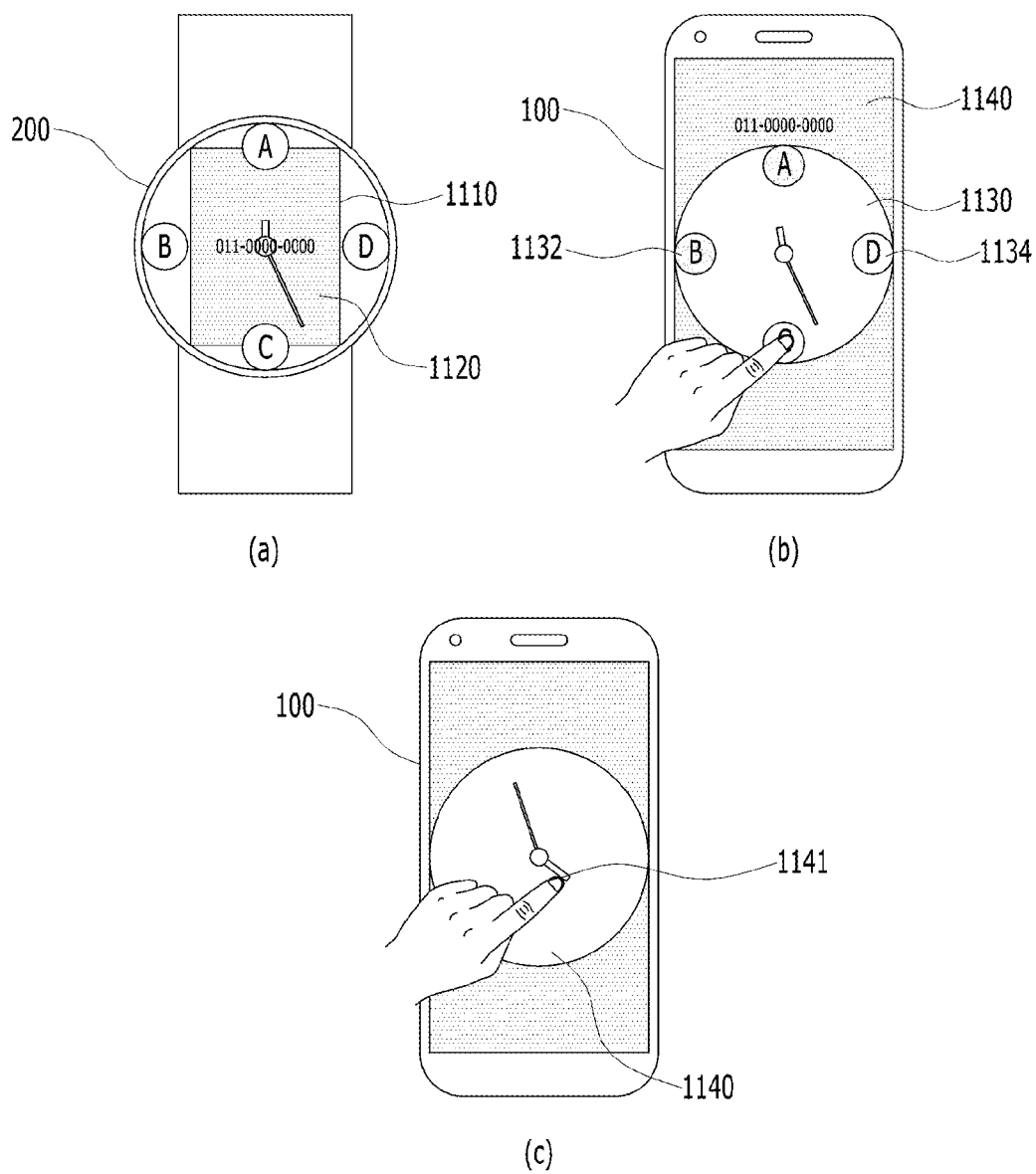
FIG. 11 is a diagram for one example of a configuration for running a function mapped to a $3^{rd}$ touch while identification information of a mobile terminal and a wearable device are different from each other and fail to be saved mutually according to one embodiment of the present disclosure.

FIG. 11 is a diagram for one example of a configuration for running a function mapped to a $3^{rd}$ touch while identification information of a mobile terminal and a wearable device are different from each other and fail to be saved mutually according to one embodiment of the present disclosure.

Referring to FIG. 11 (a), an identification information (e.g., phone number) 1120 of a mobile terminal, which is obtained through a human body communication, within a silhouette 1110 of the mobile terminal can be displayed on a watch type wearable device 200. If an information corresponding to an icon A and an information corresponding to an icon B are previously set as privacy attributes in the watch type wearable device 200, referring to FIG. 11 (b), the corresponding icon 1132 can be displayed in a deactivated shape unlike the icon 1134 not set as the privacy attribute within the silhouette 1130 of the wearable device on the mobile terminal. In doing so, the identification information 1140 of the wearable device 200 can be displayed on the mobile terminal 100.

If an icon C or an icon D is selected in the state shown in FIG. 11 (b), the information of the wearable device corresponding to the corresponding icon can be directly displayed on the touchscreen of the mobile terminal. Yet, if the icon A or the icon B is selected, a user interface for receiving an input of a command for releasing the privacy attribute can be displayed. For instance, referring to FIG. 11 (c), the watch hands 1141 are displayed on the silhouette 1140 of the watch type wearable device. If the watch hands 1141 are located through a touch input to correspond to an hour preset by the watch type wearable device 200, the information of the wearable device corresponding to the selected icon can be displayed through the mobile terminal 100.

Of course, if a privacy attribute set information exists in the wearable device worn by a user in accordance with settings, the screen shown in FIG. 11 (c) may be displayed ahead of the screen shown in FIG. 11 (b) after the $2^{nd}$ touch has been inputted. In this case, if the watch hands 1141 are moved to meet the preset location, referring to FIG. 10 (b), all icons can be displayed in activated state. Moreover, instead of the watch hands, a user interface for receiving an input of a general number/text password can be displayed or a user interface for receiving an input of a prescribed touch pattern may be displayed.

Figure 12:
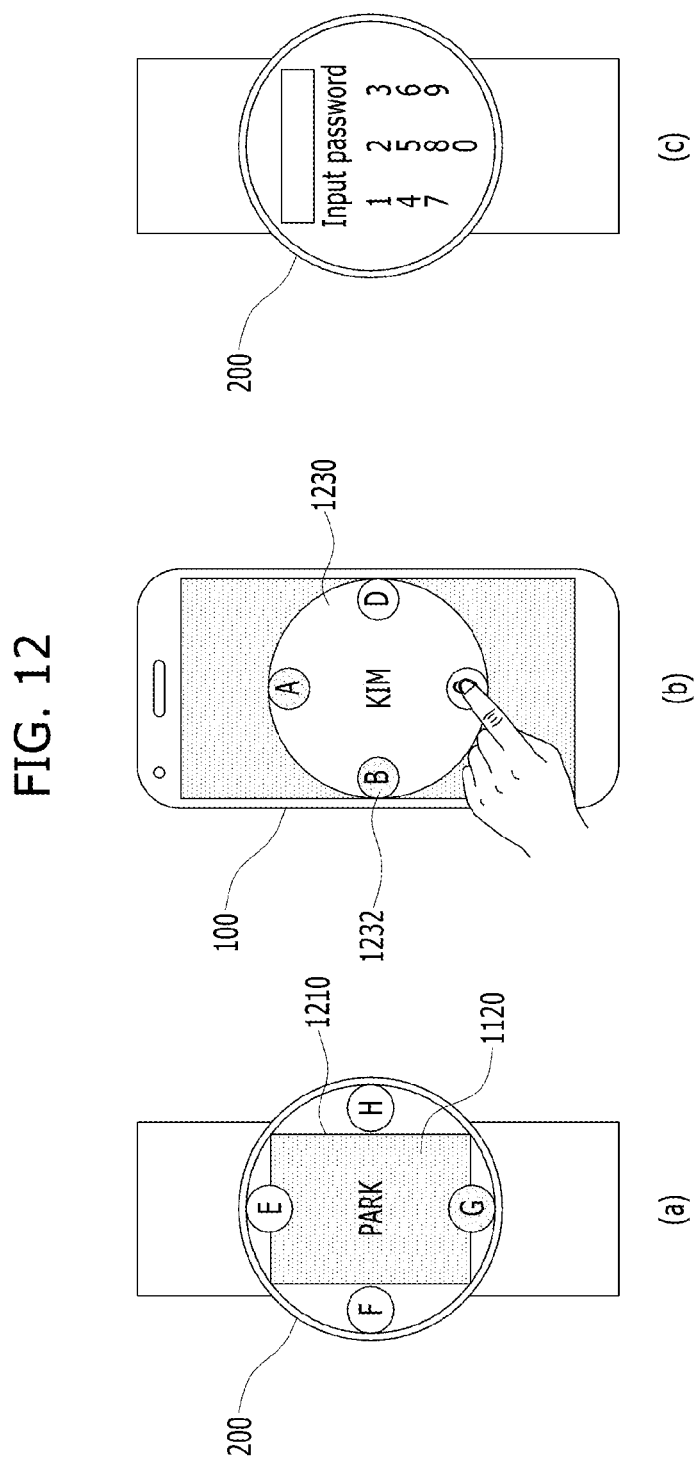
FIG. 12 is a diagram for one example of a configuration for running a function mapped to a $3^{rd}$ touch while identification information of a mobile terminal and a wearable device are different from each other but are saved mutually in advance according to one embodiment of the present disclosure.

FIG. 12 is a diagram for one example of a configuration for running a function mapped to a $3^{rd}$ touch while identification information of a mobile terminal and a wearable device are different from each other but are saved mutually in advance according to one embodiment of the present disclosure.

FIG. 10 or FIG. 11 shows the configuration that the silhouette (and the identification information) is displayed on the wearable device only to indicate whether the information exchange for the human body communication with the mobile terminal is performed. Yet, FIG. 12 assumes a situation that icons corresponding to information of a mobile terminal are displayed within a silhouette of the mobile terminal.

Referring to FIG. 12 (a), a name 1220 corresponding to an identification information of a mobile terminal saved in a phonebook of a watch type wearable device can be displayed within a silhouette 1210 of the mobile terminal, which is obtained through a human body communication, on a watch type wearable device 200. In the present diagram, a privacy attribute is set for information corresponding to an icon G of the mobile terminal.

Referring to FIG. 12 (b), a name (KIM) on the phonebook of the wearable device saved in the mobile terminal can be displayed within a silhouette 1230 of the watch type wearable device. In doing so, if a user selects an icon B for which the privacy attribute is set, referring to FIG. 12 (c), a screen for receiving an input of a password can be displayed on the wearable device 200. If a preset password is correctly inputted through the wearable device 200, the information of the wearable device corresponding to the icon B can be displayed on the mobile terminal 100.

In the following description, a process for registering a user and other external devices capable of human body communication at a wearable device is described in detail with reference to FIGS. 13 to 15.

FIG. 13 is a diagram for one example of a process for performing a user registration in a wearable device according to one embodiment of the present disclosure.

Referring to FIG. 13 (a), after a prescribed menu manipulation has been performed or a power of a wearable device has been turned on, if it is detected that the wearable device is worn by a user, a screen for receiving a confirmation for a presence or non-presence of a user registration can be displayed. If 'confirm' is selected, referring to FIG. 13 (b), a user name can be inputted and a heartbeat pattern of the user can be saved through a biometric sensor together with the user name. Of course, other biometric information (e.g., a fingerprint, etc.) capable of user identification can be saved depending on a type of a provided biometric sensor.

In doing so, the user name may be inputted through a virtual keypad (not shown in the drawing) or may refer to other previously-inputted user information (e.g., an account information, a communication service provider subscription user information, a USIM user information, etc.). For additional security, referring to FIG. 13 (c), a preset password may be inputted in case of saving user information. Thereafter, if it is detected that the wearable device is worn on a human body, the controller of the wearable device detects such a biometric information as a wearer's heartbeat pattern or the like through a biometric sensor. If the wearer is determined as a non-registered user, the process shown in FIG. 13 (a) is performed again to enable a user to be additionally registered as shown in FIG. 13 (b).

Figure 14:
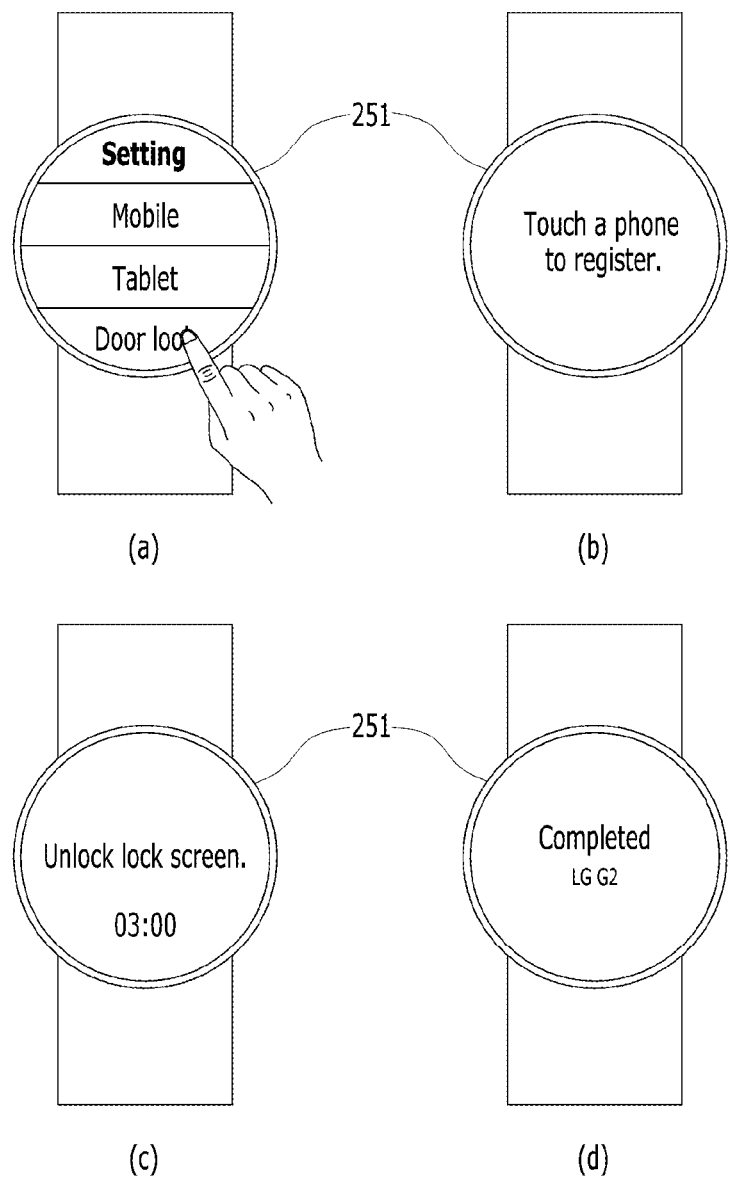
FIG. 14 is a diagram for one example of a process for performing a mobile terminal registration in a wearable device according to one embodiment of the present disclosure.

FIG. 14 is a diagram for one example of a process for performing a mobile terminal registration in a wearable device according to one embodiment of the present disclosure.

Referring to FIG. 14 (a), while a user wears a wearable device, a device registration menu can be entered. If a mobile terminal menu is selected, referring to FIG. 14 (b), a message for requesting to contact a registration target mobile terminal can be outputted. If a human body communication electrode (e.g., a separate human body communication electrode, a touchscreen connected to a human body communication module, etc.) of a registration desired mobile terminal is touched by a user, a controller of the wearable device makes a request for an information required for the registration to the mobile terminal connected by the human body communication and is then able to obtain the requested information. In doing so, referring to FIG. 14 (c), the mobile terminal can request a lock screen release. If the lock screen is successfully released in a prescribed time, the mobile terminal can transmit the information required for the registration to the wearable device. Hence, referring to FIG. 14 (d), it is able to output a message indicating that the registration target mobile terminal is registered.

Figure 15:
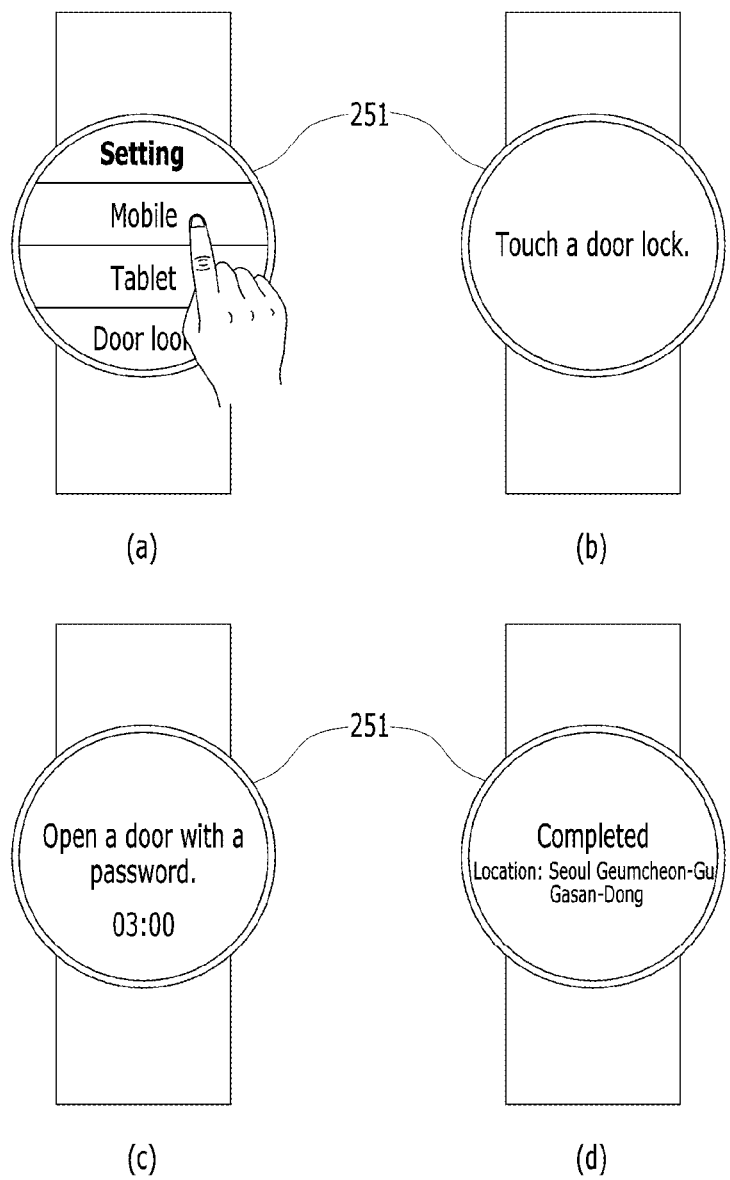
FIG. 15 is a diagram for one example of a process for performing a door lock registration in a wearable device according to one embodiment of the present disclosure.

FIG. 15 is a diagram for one example of a process for performing a door lock registration in a wearable device according to one embodiment of the present disclosure.

Referring to FIG. 15 (a), while a user wears a wearable device, a device registration menu can be entered. If a door lock menu is selected, referring to FIG. 15 (b), a message for requesting to contact a registration target door lock can be outputted. If a human body communication electrode (e.g., a human body communication electrode provided to a door lock handle, etc.) of a registration desired door lock is touched by a user, a controller of the wearable device makes a request for an information required for the registration to the door lock contacted by the human body communication and is then able to obtain the requested information. In doing so, referring to FIG. 15 (c), the door lock can request a lock release of the door lock through a password input. If the door lock is successfully unlocked in a prescribed time, the door lock can transmit the information required for the registration to the wearable device. Hence, referring to FIG. 15 (d), it is able to output a message indicating that the registration target door lock is registered.

In the above-described process, the process for registering the information of the external device in the wearable device is mainly described. Yet, it is a matter of course that the information of the wearable device can be registered in the external device (e.g., mobile terminal, door lock, etc.) by the above process. As mentioned in the foregoing description, if a device is registered in advance, a security related procedure can be skipped for a previously registered device if necessary. Hence, convenience can be enhanced. Moreover, since device information, which is to be exchanged through a human body communication is reduced, reliability of the human body communication can be raised despite that a human body contact time is relatively short.

In the following description, linkage functions performed with a door lock through a human body communication are described in detail with reference to FIG. 16 and FIG. 17.

Figure 16:
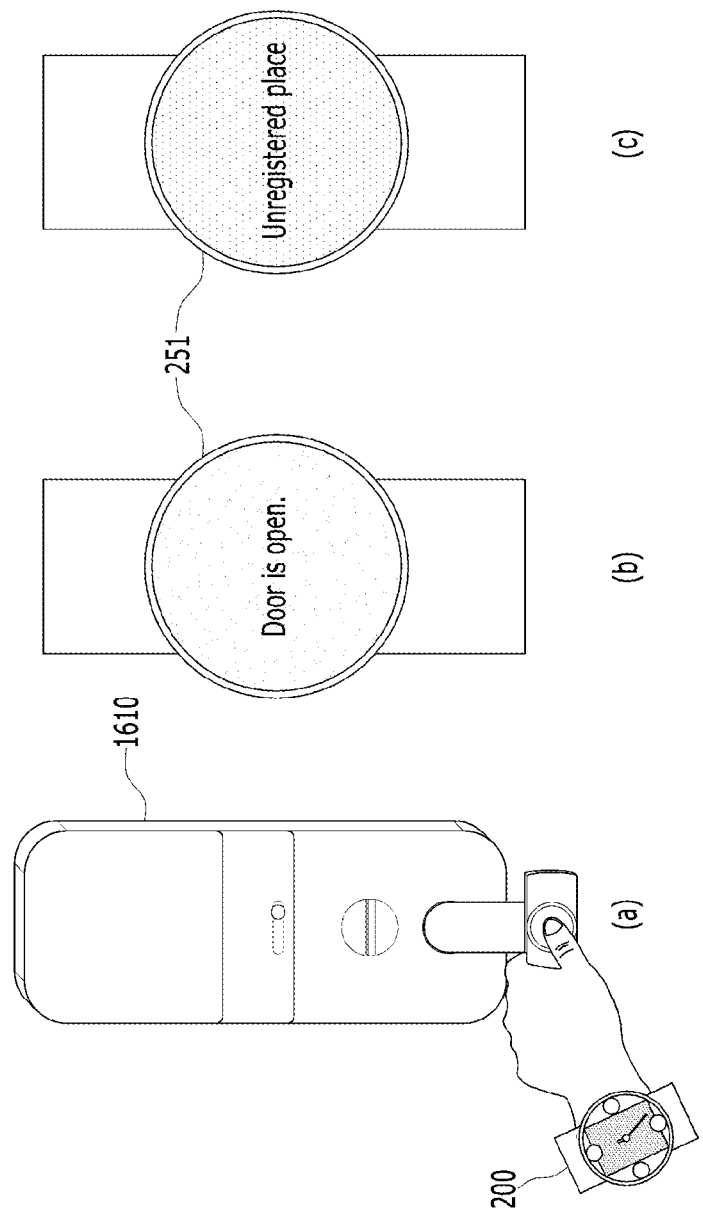
FIG. 16 is a diagram for one example of a configuration for performing a linkage function depending on a presence or non-presence of a registration of a door lock in wearable device according to one embodiment of the present disclosure.

FIG. 16 is a diagram for one example of a configuration for performing a linkage function depending on a presence or non-presence of a registration of a door lock in wearable device according to one embodiment of the present disclosure.

Referring to FIG. 16 (a), while a user wears a wearable device, when the user touches a handle of a door lock 1610 supportive of a human body communication, if information of the door lock 1610 and information of the wearable device are mutually registered, a lock of the door lock can be released without a password input. Hence, referring to FIG. 16 (b), a corresponding message can be outputted. If the user touches a handle of an unregistered door lock, referring to FIG. 16 (c), an error message can be outputted.

FIG. 17 is a diagram for another example of a configuration for performing a linkage function depending on a presence or non-presence of a registration of a door lock in wearable device according to one embodiment of the present disclosure.

Referring to FIG. 17, while a user wears a wearable device 200, if the user touches a handle of a pre-registered door lock 1610 supportive of a human body communication in a specific pattern (e.g., gripping and releasing the handle plural times, holding the handle over prescribed duration, etc.) [FIG. 17 (a)], a menu for a user to confirm whether to compose a memo for the door lock can be displayed on a touchscreen 251 of the wearable device 200 [FIG. 17 (b)]. If the user selects 'confirm', a menu for composing a new memo and/or a memo for checking a pre-composed memo can be displayed [FIG. 17 (c)]. The composed memo can be saved in a memory of the wearable device 200 or a memory of the door lock 1610. After the memo has been saved, if the user currently wearing the wearable device grips the door lock handle, a content of the composed memo can be displayed on the touchscreen 251 of the wearable device 200 [FIG. 17 (d)].

Figure 18:
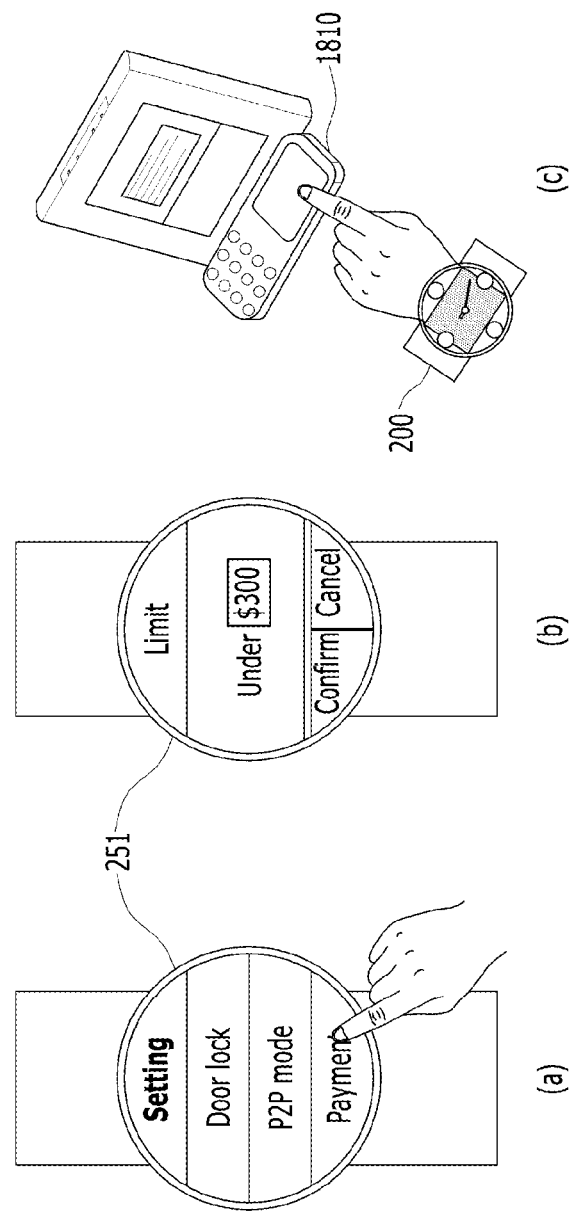
FIG. 18 is a diagram for one example of a configuration for making a payment through a wearable device according to one embodiment of the present disclosure.

FIG. 18 is a diagram for one example of a configuration for making a payment through a wearable device according to one embodiment of the present disclosure.

Referring to FIG. 18, while a user wears a wearable device, a human body communication setting menu can be entered [FIG. 18 (*a*)]. If a payment menu is selected, a menu for setting an upper limit amount of a payment system through a human body communication can be displayed [FIG. 18 (*b*)]. Thereafter, if the user currently wearing the wearable device contacts a payment terminal 1810 supportive of the human body communication, a payment of an amount within the set payment limit can be made using payment related information (e.g., credit card information, small amount payment information by communication service provider, etc.) previously saved in the wearable device [FIG. 18 (*c*)].

In addition to the above-mentioned door lock and payment terminal, the present disclosure is applicable to a case that a body of a user currently wearing a wearable device contacts one of the following devices.

- Car: if a handle (or an electrode) is gripped, a car engine starts automatically and convenience device settings (e.g., seat angle, play music selection, etc.) optimized for a user of a wearable device can be provided. If an electrode of an external door handle is gripped, a car door can be opened without a separate key.
- Air conditioner: if a remote controller is gripped, a channel last watched by a user currently wearing a wearable device can be displayed. Moreover, an abbreviated channel number can be changed by a user's setting.
- Lamp switch: if a lamp switch is contacted, an illumination can be lit at the brightness set by a user currently wearing a wearable device.
- Refrigerator: if a refrigerator door is opened, a count of today's use by a user currently wearing a wearable device can be indicated.
- Drink vending machine: if a drink button is selected, a payment can be made at a time. And, a drink previously determined by a user can be selected irrespective of an actually pushed button.
- Notebook or desktop: if a mouse is gripped, a user is recognized so that an operating system can be unlocked in direct.
- Automated teller machine (ATM): if an amount to be withdrawn is selected, inputs of an account number/card and a password can be skipped.

Meanwhile, according to another embodiment of the present disclosure, through a linkage operation with a worn wearable device, various convenience functions can be provided by a mobile terminal.

Figure 19:
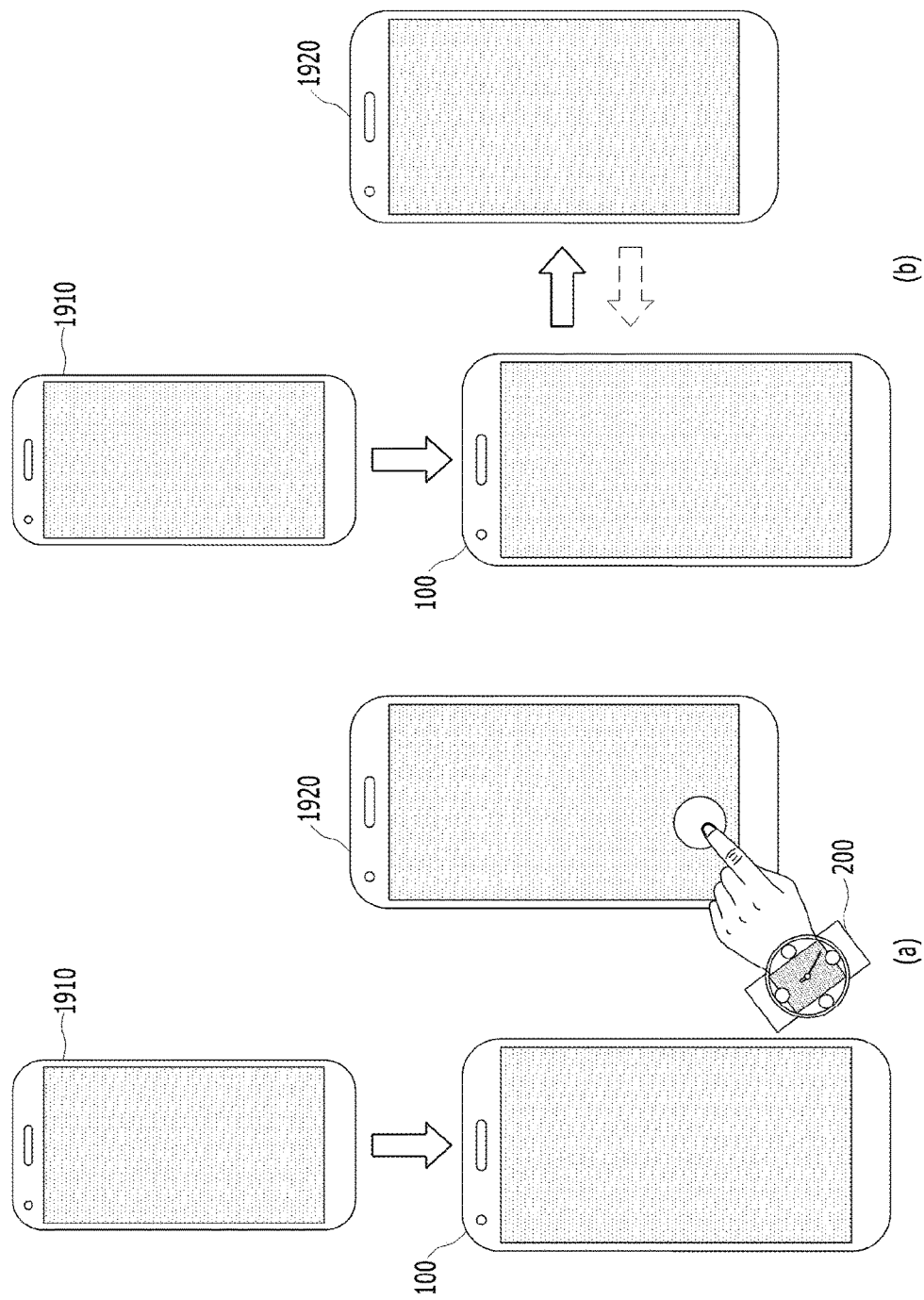
FIG. 19 is a diagram for one example of a configuration for performing a call switching through a wearable device according to one embodiment of the present disclosure.

FIG. 19 is a diagram for one example of a configuration for performing a call switching through a wearable device according to one embodiment of the present disclosure.

Referring to FIG. 19 (*a*), while a call is in process owing to an incoming call from a counterpart terminal 1910 to a mobile terminal 100, if a user currently wearing a wearable device 200 touches an external terminal 1920, Bluetooth access information of the mobile terminal 100 can be delivered to the external terminal 1920 from the wearable device 200. Hence, referring to FIG. 19 (*b*), the mobile terminal 100 and the external terminal 1920 are connected to each other by Bluetooth and the call with the counterpart terminal 1910 can be performed through the external terminal 1920. Of course, the mobile terminal 100 participates in the call to bring an effect such as a conference call.

Figure 20:
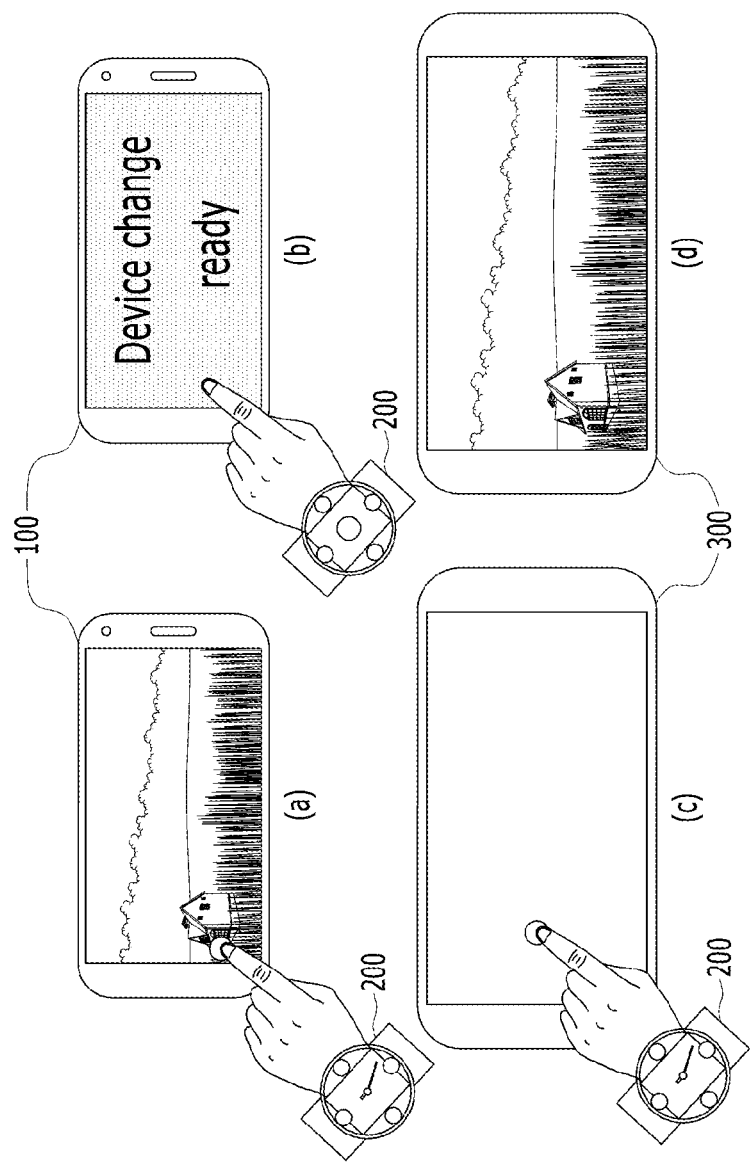
FIG. 20 is a diagram for one example of a configuration for performing a task transfer through a wearable device according to one embodiment of the present disclosure.

FIG. 20 is a diagram for one example of a configuration for performing a task transfer through a wearable device according to one embodiment of the present disclosure.

Referring to FIG. 20 (*a*), while a content is played in a mobile terminal 100, a user currently wearing a wearable device 200 can input a touch of a specific pattern to a touchscreen. Hence, referring to FIG. 20 (*b*), information (e.g., a content title, a location of a content, a play state/view of a content, etc.) of the currently played content is delivered to the wearable device 200 through the human body communication and a message indicating that a task transfer is available can be displayed on the mobile terminal 100. Thereafter, referring to FIG. 20 (*c*), if the user touches another external device 300, the information of the content can be transmitted to the external device 300 from the wearable device 200 through the human body communication. Hence, referring to FIG. 20 (*d*), a play of the corresponding content can be resumed in the external device 300.

FIG. 21 is a diagram for one example of a method of checking an occurring event in a mobile terminal by wearing a wearable device according to another embodiment of the present disclosure.

Referring to FIG. 21, an event of receiving a text occurs in a watch type wearable device 200 [FIG. 21 (*a*)]. If a user currently wearing the wearable device 200 knocks a touchscreen 151 in a turned-off state twice in a predetermined time from the event occurrence [FIG. 21 (*b*)], the touchscreen 151 is turned on and a popup window 2110, which is provided to confirm whether to check a message arriving at the wearable device 200 through the mobile terminal, can be displayed on a screen (e.g., a home screen) displayed as a default [FIG. 21 (*c*)]. In doing so, if the popup window 2110 is touched or a random region on the touchscreen 151 is touched twice again (i.e., knock-on), the message arriving at the wearable device is forwarded to the mobile terminal through the human body communication and the corresponding message can be displayed on the touchscreen 151 of the mobile terminal [FIG. 21 (*d*)]. In some cases, the step of FIG. 21 (*c*) can be skipped.

The text message reception in FIG. 21 is one example of an event, by which the present disclosure is non-limited. And, it is a matter of course that the present disclosure is applicable to various events including an alarm occurrence and the like.

Figure 22:
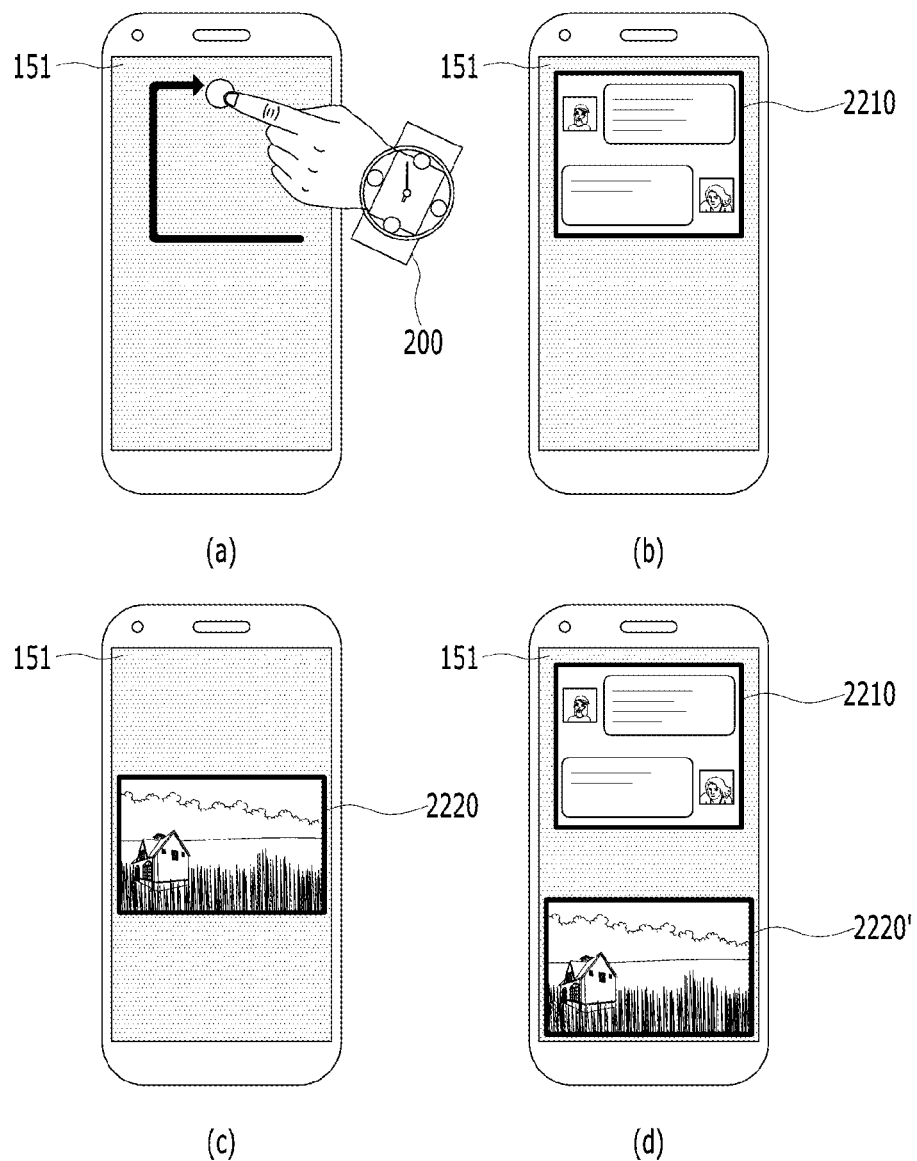
FIG. 22 is a diagram for another example of a method of checking an occurring event in a mobile terminal by wearing a wearable device according to another embodiment of the present disclosure.

FIG. 22 is a diagram for another example of a method of checking an occurring event in a mobile terminal by wearing a wearable device according to another embodiment of the present disclosure.

Referring to FIG. 22, if a user currently wearing a wearable device 200 draws a diagram on a touchscreen 151 of a mobile terminal [FIG. 22 (*a*)], a running screen of a specific application can be displayed on a region 2210 corresponding to the drawn diagram [FIG. 22 (*b*)]. In this case, the diagram drawn by the user is a rectangle for example. The user can draw other diagrams such as other polygons or circles. And, it is a matter of course that a running screen of an application can be displayed to correspond to a shape of the corresponding diagram. If a diagram is drawn in a predetermined time from an event occurrence in the wearable device, the specific application may include one of an application related to the occurring event, an application last run in the wearable device, an application predetermined in the wearable device and the like.

In doing so, if the user draws another diagram 2220 to overlap the previously drawn diagram 2210 at last in part, the previous diagram 2210 disappears but a running screen of a different application can be displayed within the new diagram 2220 [FIG. 22 (*c*)]. In this case, the different application may include an application having a priority lower than that of the previously displayed application or an application having an event occurring further previously.

If the user draws a diagram 2220' not to overlap the previously drawn diagram 2210, a running screen of the different application can be displayed within the new diagram 2220' while the previous diagram 2210 does not disappear [FIG. 22 (*d*)].

According to the description with reference to FIG. 22, the diagram is drawn while the touchscreen is turned off. Yet, even if the touchscreen is turned on, the above-described function can be executed until a prescribed time expires from an occurrence of an event in the wearable device.

Figure 23:
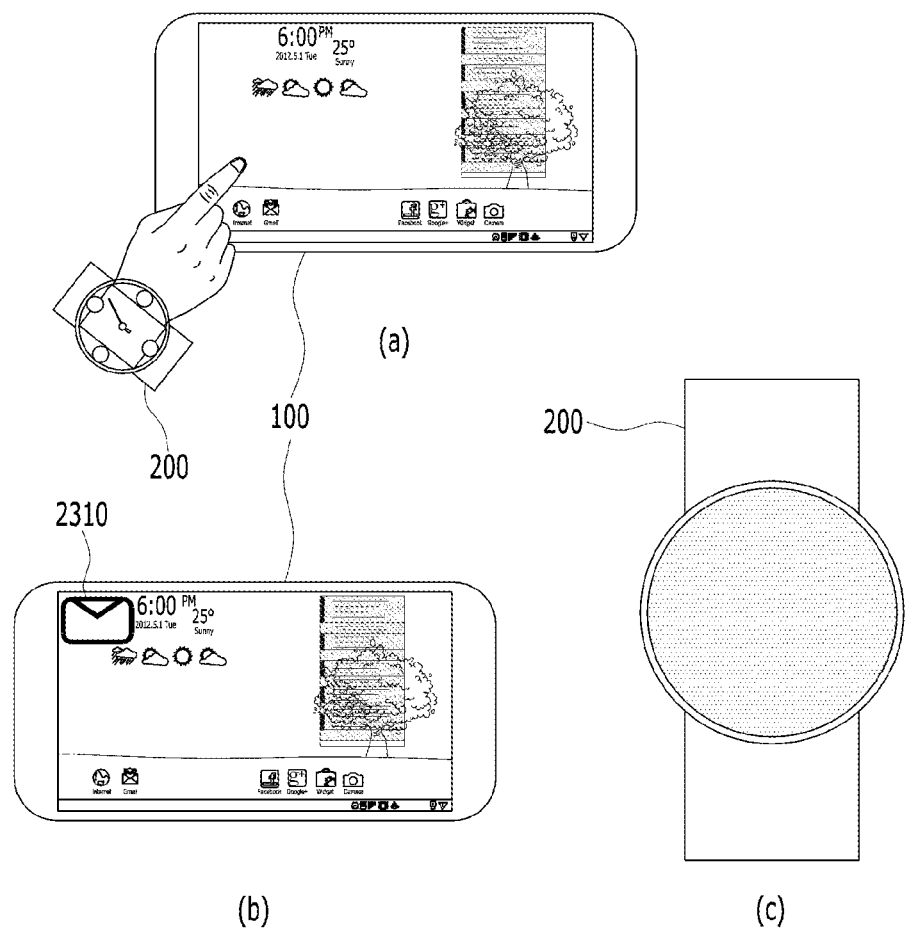
FIG. 23 is a diagram for further example of a method of checking an occurring event in a mobile terminal by wearing a wearable device according to another embodiment of the present disclosure.

FIG. 23 is a diagram for further example of a method of checking an occurring event in a mobile terminal by wearing a wearable device according to another embodiment of the present disclosure.

Referring to FIG. 23 (*a*), when a user currently wearing a wearable device 200 manipulates a mobile terminal 100 (i.e., it is able to detect a presence or non-presence of a contact with the mobile terminal 100 through a human body communication), an event (e.g., a text message reception) may occur in the wearable device 200. In this case, referring to FIG. 23 (*b*), an event related information is transmitted to the mobile terminal currently manipulated by the user through the human body communication so that the event related information 2310 can be displayed on a touchscreen of the mobile terminal 100. In doing so, referring to FIG. 23 (*c*), any information may not be displayed on the wearable device 200. Through this, the user can check the event information through the currently manipulated device without averting user's eyes to the wearable device 200. Similarly, when a user currently wearing a wearable device is making a phone call through a mobile terminal, if a text message is received by the mobile terminal in the course of the call, any notification output is not generated from the mobile terminal but information on the text message received by the mobile terminal can be outputted from the wearable device [not shown in the drawing]. Hence, the user can check the text message without being interrupted in the course of the phone call.

Figure 26:
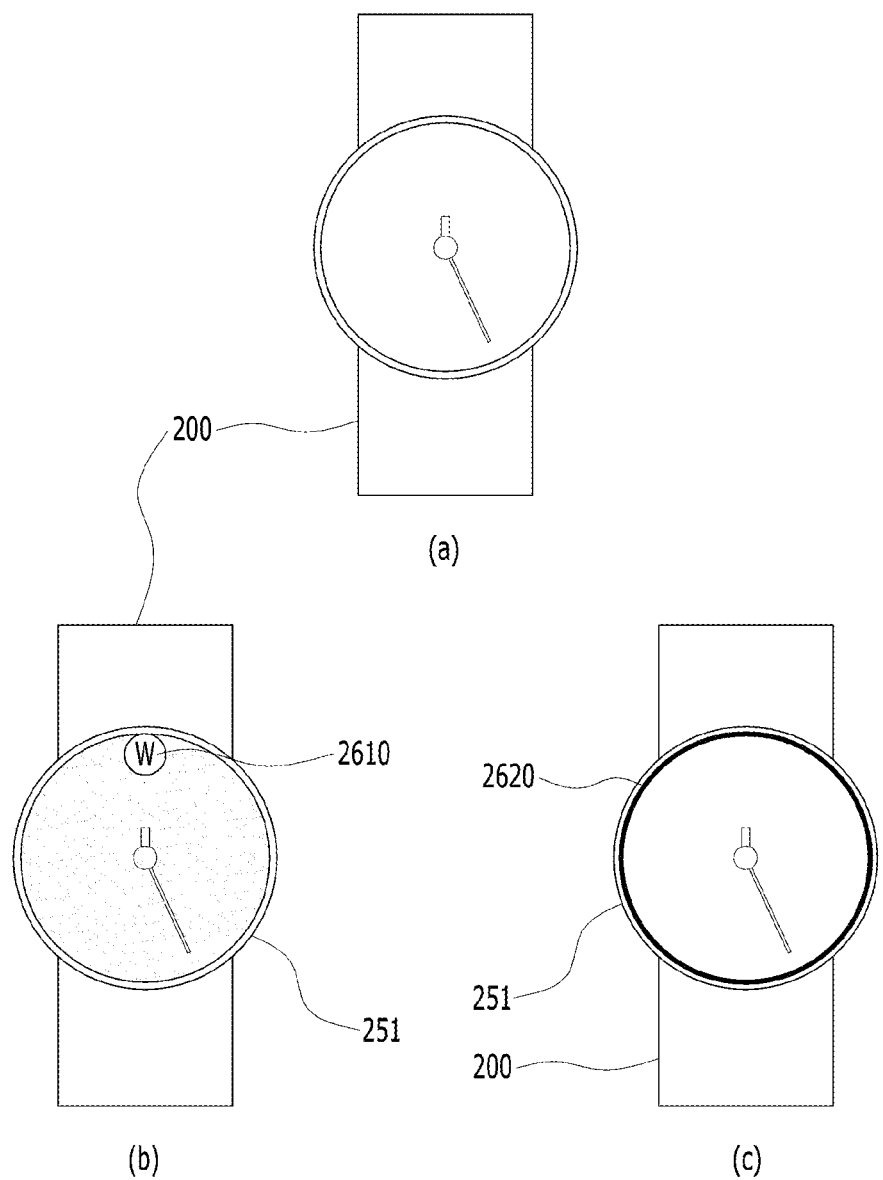
FIG. 26 is a diagram for one example of a method of informing a user whether a wearable device is worn, applicable to embodiments of the present disclosure.

In the following description, explained with reference to FIGS. 24 to 26 are a method of determining whether a wearable device is worn, a disposed structure of sensors and electrodes of a human body communication module, and a method of informing a user whether a wearable device is worn, applicable to embodiments of the present disclosure.

FIG. 24 is a diagram for one example of a method of determining whether a wearable device is worn, applicable to embodiments of the present disclosure.

Referring to FIG. 24 (*a*), a wearing detection means 2400 can be provided to a human body contacted part (e.g., a rear surface of a main body of a watch type 200, a rear surface of a chain of a necklace type 200', an inner lateral surface of a glasses leg of a glasses type 200'', etc.) of each wearable device. The wearing detection means 2400 may employ an electrostatic detection method, an optical detection method or the like and may include a flexible material for enhancement of wearing sensation.

According to the electrostatic detection method, referring to FIG. 24 (*b*), a Tx electrode 2420 and a Rx electrode 2430 are disposed on an electrode pad 2410 in a manner of being spaced apart from each other in a prescribed distance. When the pad 2410 is contacted with a skin, a detecting unit 2440 can be implemented to determine an electrostatic capacitance change generated between the electrodes. In this case, referring to FIG. 24 (*c*), an electrode disposition can be variously modified if necessary.

According to the optical detection method, referring to FIG. 24 (*d*), a light applied from a light emitting unit 2450 through an opening formed on a pad 1910 is reflected by a skin. Hence, a change due to the reflection is detected by a light receiving unit 2460 to detect whether a wearable device is worn.

Anti-reflection coating may apply to a passage for the light transmission not to be seen externally. And, a physical filter may apply to the light receiving unit 2460 to cut off influence from other external lights.

In order to determine whether the light applied by the light emitting unit is reflected by the skin or other materials, the light receiving unit can emit light in specific pattern and can be implemented to diversify wavelengths of the light. In this case, the light receiving unit can more accurately determine whether the light of the light emitting unit is reflected by the skin in a manner of analyzing patterns of the reflective lights incident per wavelength.

In addition to the electrostatic detection method and the optical detection method, a presence or non-presence of the wearing can be detected through a presence or non-presence of a user's movement using an acceleration sensor or a gyro sensor.

FIG. 25 is a diagram for one example of a disposed structure of sensors and electrodes of a human body communication module, applicable to embodiments of the present disclosure.

Referring to FIG. 25 (*a*), a biometric sensor 143, a pad 2410 of a wearing detection means and a transceiving electrode 2510 of a human body communication module are provided to a rear surface of a main body of a watch type wearable device to enable a heartbeat rate detection, a detection of a presence or non-presence of a wearing, and a human body communication.

Referring to FIG. 25 (*b*), the transceiving electrode 2510 for the human body communication is connected to an electrostatic sensor 2440 of the wearing detection means. Hence, the electrostatic sensor 2440 can determine a presence or non-presence of a contact between a human body and an external device target for performing the human body communication. If the electrostatic sensor 2440 determines the contact with an external device through an electrostatic capacitance change, the electrostatic sensor 2440 informs a controller 180 of the determination of the contact so that the controller 180 can activate a human body communication module 130.

Meanwhile, a PTC (positive temperature coefficient) device (not shown in the drawing) is provided between the human body communication module 130 and the transceiving electrode 2510 to protect a human body from overcurrent. Moreover, a voltage sensor is provided between the PTC device and the transceiving electrode 2510 so that information including different information in accordance with a plurality of voltage levels can be transmitted by the human body communication. For instance, multimedia data may be transmitted at a voltage of a level slightly lower than a PCT cutoff level, general data (e.g., text, file, etc.) may be transmitted at a voltage lower than the PCT cutoff level, and a presence or non-presence of a contact with an external device may be recognized at a voltage further lower than the PCT cutoff voltage.

FIG. 26 is a diagram for one example of a method of informing a user whether a wearable device is worn, applicable to embodiments of the present disclosure.

Referring to FIG. 26 (*a*), a watch type wearable device 200 is not worn by a user. In doing so, if it is determined that the watch type wearable device 200 is worn by the user, referring to FIG. 26 (*b*), a color of a background screen of a touchscreen 251 of the watch type wearable device 200 can be changed for a predetermined time. And, an indicator 2610 can be displayed on a prescribed region of the touchscreen 251 to indicate that the watch type wearable device 200 is currently worn. After the elapse of a predetermined time, referring to FIG. 26 (*c*), the background color change of the touchscreen 251 may disappear. Moreover, the indicator 2610 disappears from the touchscreen 251 of the watch type wearable device 200 and a prescribed visual effect can be given to an edge of the touchscreen 251.

It will be apparent to those skilled in the art that various modifications and variations can be specified into other form(s) without departing from the spirit or scope of the disclosures.

According to one embodiment of the present disclosure, the above-described methods can be implemented in a program recorded medium as computer-readable codes. The computer-readable media include all kinds of recording devices in which data readable by a computer are saved. The computer-readable media include ROM, RAM, CD-ROM, magnetic tapes, floppy discs, optical data storage devices, and the like for example and also include carrier-wave type implementations (e.g., transmission via Internet).

The aforementioned embodiments are achieved by combination of structural elements and features of the present disclosure in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present disclosure.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a wireless communication unit;
a human body communication unit configured to transfer signals to a wearable device using a human body as a transmission medium;
a touchscreen; and
a controller configured to control communication between a device worn by a user and the mobile terminal through the human body communication unit,
wherein, in response to sensing a first touch on the touchscreen in a turned-off state and sensing a second touch on the touchscreen in a turned-off state while the first touch is sensed, device information is exchanged with the device while at least one of the first touch or the second touch is sensed, and information of the device is displayed on the touchscreen using the exchanged device information,
wherein the controller is further configured to:
in response to reception of a message via the wireless communication unit while the wireless communication unit performs a phone call, output information about the received message via the wearable device without generating a notification output via the mobile terminal.

2. The mobile terminal of claim 1, wherein, when a third touch is sensed on the touchscreen while the information of the device worn by the user is displayed on the touchscreen, the controller controls a function mapped to the third touch to be performed.

3. The mobile terminal of claim 2, wherein the displayed information of the device includes an icon corresponding to an application installed or installable on the device.

4. The mobile terminal of claim 3, wherein when the icon corresponds to the application installed on the device, the icon is displayed on an image displayed on the touchscreen, the image having a prescribed shape corresponding to a type of the device.

5. The mobile terminal of claim 4, wherein when the icon corresponds to the installable application, the icon is displayed outside the prescribed shape of the image and, when the icon corresponding to the installable application is moved onto the image from outside the prescribed shape through a fourth touch at the touchscreen, an application corresponding to the moved icon is installed on the device worn by the user.

6. The mobile terminal of claim 4, wherein the icon is displayed to have a different visual effect based on whether a security setting for accessing the application has been set for the application associated with the icon.

7. The mobile terminal of claim 2, wherein the exchanged device information includes at least one of identification information of the mobile terminal and the device, information on an installed application, information on a running state of a currently run application, information on a type of the device, information of wireless communication capability for a data path establishment through a wireless communication unit, or security information for the data path establishment.

8. The mobile terminal of claim 7, further comprising a wireless communication unit, wherein the controller establishes the wireless data path with the device through the wireless communication unit using the wireless communication capability information and the security information, and wherein when physical contact with a body of the user is released, the controller controls the data exchange with the device to be performed thereafter through the established wireless data path.

9. The mobile terminal of claim 8, wherein information required for executing the function mapped to the third touch is received from the device through the established wireless data path.

10. The mobile terminal of claim 3, wherein the icon is displayed to have a different visual effect depending on whether at least one portion of the identification information of the device is saved in the mobile terminal in advance and whether at least one portion of the identification information of the device matches the identification information of the mobile terminal.

11. A method of controlling a mobile terminal, comprising:
   in response to sensing a first touch input on a touchscreen of the mobile terminal in a turned-off state and sensing a second touch input on the touchscreen in a turned-off state while the first touch input is sensed, exchanging device information with a device worn by a user while at least one of the first touch input or the second touch input is sensed, the device information being exchanged with the device through a human body communication of the mobile terminal unit configured to transfer signals to a wearable device using a body of the user as a transmission medium; and
   displaying information of the device worn by the user on the touchscreen using the exchanged device information,
   wherein the method further comprises:
      in response to reception of a message via a wireless communication unit of the mobile terminal while the wireless communication unit performs a phone call, outputting information about the received message via the wearable device without generating a notification output via the mobile terminal.

12. The method of claim 11, further comprising:
   inputting a third touch input while the information of the device worn by the user is displayed on the touchscreen; and
   executing a function mapped to the third touch input.

13. The method of claim 12, wherein the displayed information of the device includes an icon corresponding to an application installed or installable on the device.

14. The method of claim 13, wherein when the icon corresponds to the application installed on the device, the icon is displayed on an image displayed on the touchscreen, the image having a prescribed shape corresponding to a type of the device.

15. The method of claim 14, further comprising:
   when the icon corresponds to the installable application, displaying the icon corresponding to the installable application outside the prescribed shape of the image; and
   when the icon corresponding to the installable application is moved onto the image from outside the prescribed shape through a fourth touch input at the touchscreen, installing an application corresponding to the moved icon on the device worn by the user.

16. The method of claim 14, wherein the icon is displayed to have a different visual effect based on whether a security setting for accessing the application has been set for the application associated with the icon.

17. The method of claim 12, wherein the exchanged device information includes at least one of identification information of the mobile terminal and the device, information on an installed application, information on a running state of a currently run application, information on a type of the device, information of wireless communication capability for a data path establishment through a wireless communication unit, or security information for the data path establishment.

18. The method of claim 17, further comprising establishing the wireless data path with the device using the wireless communication capability information and the security information, wherein when physical contact with a body of the user is released, performing data exchange with the device thereafter through the established wireless data path.

19. The method of claim 18, wherein information required for executing the function mapped to the third touch input is received from the device through the established wireless data path.

20. The method of claim 13, further comprising
   displaying the icon to have a different visual effect depending on whether at least one portion of the identification information of the device is saved in the mobile terminal in advance and whether at least one portion of the identification information of the device matches the identification information of the mobile terminal.

* * * * *